United States Patent [19]

Crelier et al.

[11] Patent Number: 5,909,580

[45] Date of Patent: Jun. 1, 1999

[54] DEVELOPMENT SYSTEM AND METHODS WITH DIRECT COMPILER SUPPORT FOR DETECTING INVALID USE AND MANAGEMENT OF RESOURCES AND MEMORY AT RUNTIME

[75] Inventors: Regis Crelier, Santa Cruz; James Lee Cantey, Campbell, both of Calif.

[73] Assignee: Inprise Corporation, Scotts Valley, Calif.

[21] Appl. No.: 08/598,309

[22] Filed: Feb. 8, 1996

[51] Int. Cl.⁶ .................................................. G06F 11/08
[52] U.S. Cl. ................................. 395/705; 395/704
[58] Field of Search ............................ 395/705, 702–704, 395/709; 364/280.4

[56] References Cited

U.S. PATENT DOCUMENTS 5,193,180  3/1993  Hastings ................................. 395/575
5,335,344  8/1994  Hastings ................................. 395/575

OTHER PUBLICATIONS

Maguire, S., *Writing Solid Code,* Microsoft Press, pp. 45–73, 1993.

*Primary Examiner*—Frantzy Poinvil
*Attorney, Agent, or Firm*—John A. Smart

[57] ABSTRACT

A development system having a compiler, a linker, and an interface for detecting invalid use of resource is generated. When the system is (optionally) operating in a "code guarded" mode, the linker links the object modules with a CodeGuard® Library to generate "code guarded" program (s). The API (Application Programming Interface) calls to the runtime libraries are "wrappered" by CodeGuard wrapper functions. Additionally in this mode, operation of the compiler is altered to insert calls from the user code (e.g., compiled code in object modules) to the CodeGuard Runtime Library, for checking runtime use of resources and memory. As a result, the system can identify a programming error at the location where it occurs that is, at the original line of code which gave rise to the problem in the first place. Errors are found immediately as they happen, so that the original offending site can be determined. In this manner, the task of creating computer programs is simplified.

15 Claims, 9 Drawing Sheets

5,909,580

DEVELOPMENT SYSTEM AND METHODS WITH DIRECT COMPILER SUPPORT FOR DETECTING INVALID USE AND MANAGEMENT OF RESOURCES AND MEMORY AT RUNTIME

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to system and methods for increasing reliability of software programs. More particularly, the present invention relates to a development system and methods for runtime detection of resource and memory errors occurring in software programs operative on digital computers.

Before a digital computer may accomplish a desired task, it must receive an appropriate set of instructions. Executed by the computer's microprocessor, these instructions, collectively referred to as a "computer program," direct the operation of the computer. Expectedly, the computer must understand the instructions which it receives before it may undertake the specified activity.

Owing to their digital nature, computers essentially only understand "machine code," i.e., the low-level, minute instructions for performing specific tasks—the sequence of ones and zeros that are interpreted as specific instructions by the computer's microprocessor. Since machine language or machine code is the only language computers actually understand, all other programming languages represent ways of structuring human language so that humans can get computers to perform specific tasks.

While it is possible for humans to compose meaningful programs in machine code, practically all software development today employs one or more of the available programming languages. The most widely used programming languages are the "high-level" languages, such as C or Pascal. These languages allow data structure and algorithms to be expressed in a style of writing which is easily read and understood by fellow programmers.

A program called a "compiler" translates these instructions into the requisite machine language. In the context of this translation, the program written in the high-level language is called the "source code" or source program. The ultimate output of the compiler is an "object module," which includes instructions for execution by a target processor. Although an object module includes code for instructing the operation of a computer, the object module itself is not in a form which may be directly executed by a computer. Instead, it must undergo a "linking" operation before the final executable program is created.

Linking may be thought of as the general process of combining or linking together one or more compiled object modules to create an executable program. This task usually falls to a program called a "linker." In typical operation, a linker receives, either from the user or from an integrated compiler, a list of object modules desired to be included in the link operation. The linker scans the object modules from the object and library files specified. After resolving inter-connecting references as needed, the linker constructs an executable image by organizing the object code from the modules of the program in a format understood by the operating system program loader. The end result of linking is executable code (typically an .exe file) which, after testing and quality assurance, is passed to the user with appropriate installation and usage instructions.

Since computer programs are created from source code which a user supplies, the source code is an inherent source of errors. During the course of software development, therefore, substantial development resources are allocated today to the process of finding "bugs" in the software. As used herein, "bugs" refer to errors occurring in the program being developed. Bugs, for example, can be anything from taking an unexpected path in the logical flow to inadvertently writing to a wrong memory location. Expectedly, there is keen interest in finding ways to improve the "debugging" of software.

A program called a "debugger" is often employed for finding and eliminating errors in software programs. A debugger should provide certain basic services to assist programmers in finding and correcting errors in software programs. These services include breakpointing, stepping and stopping a debuggee. Other services may include inspecting and changing data in memory, symbolic debugging, source level debugging, and setting breakpoints with expression evaluation. The general topic of debuggers is well covered by the technical, trade, and patent literature. For a detailed introduction to the topic, the reader may consult Swan, T., *Mastering Turbo Debugger*, Hayden Books, 1990. Additional treatment of the topic may be found in Intel Corporation's 80386 *Programmer's Reference Manual*, Intel Corp., Santa Clara, Calif., 1986. The disclosures of the foregoing are hereby incorporated by reference.

Although debuggers are good for examining particular locations of program code for errors, whole classes of programming exist for which the "location" of the error is not easily discerned. Examples of these types of problems include memory overruns, incorrectly type-casted C++ objects, memory allocation/de-allocation errors, heap correction, and use of uninitialized data. In addition to general memory problems, similar problems occur with other resources, such as file handles, window handles, windows GDI (graphic device independent) objects, and other objects which must be freed after use. Stated generally, these comprise errors or bugs which lead to memory corruption and "resource leaks."

Prior art attempts at addressing these types of errors have focused largely on diagnosing "the problem" after the damage has occurred. In Microsoft Windows, for instance, built-in support exists for detecting an attempt to access an invalid region of memory—de-referencing a "bad pointer." The mechanism is a post-problem tool, with results that are far from perfect. De-referencing a bad pointer in a program may or may not trigger the built-in protection mechanism, depending on whether the memory being accessed belongs to the application (despite the fact that the attempted access is not what is desired). All told, there exists a variety of problems which result from user errors in the source code, which are not detected at compile time and which are difficult to diagnose with available debuggers.

A rudimentary approach to preventing memory errors is to write a wrapper function around the memory allocation function, malloc. This fairly well known technique is described, for instance, in *Writing Solid Code*, by Steve McGuire (Microsoft Press). Typically, the malloc routine is rewritten to include an ASSERT (macro) call, for validating the parameter passed to the call. The approach does not allow one to track the error down to the level where the corruption really occurred—what the programmer really wants. Thus, the foregoing approach does not give the information which is really desired (i.e., exactly where the corruption occurred). It also requires the programmer to maintain additional code (i.e., the programmer's own wrapper code) outside of the standard library and that he or she really understand the wrapper's interaction with the library.

SUMMARY OF THE INVENTION

A development system of the present invention includes a compiler, a linker, and an interface. Through the interface, the developer user supplies source modules to the compiler. From the source code or listings and headers/includes files, the compiler "compiles" or generates object module(s). In turn, the linker "links" or combines the object modules with runtime libraries (e.g., Standard C runtime library functions) to generate program(s), which may be executed by a target processor. The runtime libraries include previously-compiled standard routines, such as graphics, I/O routines, startup code, math libraries and the like.

When the system is (optionally) operating in a "code guarded" mode, the linker links the object modules with a CodeGuard® Library of the present invention to generate "code guarded" program(s). Specifically, the API (Application Programming Interface) calls to the runtime libraries are "wrapped" by CodeGuard wrapper functions. Appropriate CodeGuard header files and CodeGuard Import Library are provided for permitting linking to the CodeGuard wrapper functions. Additionally in this mode, operation of the compiler is altered to insert calls from the user code (e.g., compiled user code in object modules) to the CodeGuard Runtime Library, for checking runtime use of resources and memory. In a preferred embodiment, the CodeGuard Runtime itself is typically provided as a dynamically-linked library (i.e., "DLL"). The approach adopted by the present invention is to identify a programming error at the location where it occurs—that is, at the original line of code which gave rise to the problem in the first place. Errors are found immediately as they happen, so that the original site can be determined.

In a preferred embodiment, the CodeGuard Library in the system of the present invention provides for rigorous validation of memory and resource operations. The library is employed at runtime for runtime validation, as well as at compile time, so that the compiler can validate the object which it is working on. As a result, in a preferred embodiment, the development environment is modified at two locations providing the support, at the runtime libraries and at the compiler.

Of particular interest to the present invention are all program objects which "allocate" resources and "free" resources, as well as objects which use those resources. As a result, use of the runtime libraries is of particular interest, since the vast majority of functions (e.g., standard C functions) allocate resources, free resources, and/or use those resources. Functions which copy strings are typical in this regard. For instance, the standard string runtime library functions (e.g., string Standard C library) process strings which are "resources." The system observes these types of operations, for checking for validity.

A particular category of direct compiler operations exist for which the only way to feasibly catch an error is at the compiler—that is, the compiler must be taught how to catch the error. This category of problems, which includes direct assignments (e.g., direct assignments of pointers or of data, requires some access to the underlying source code, before underlying symbol information is discarded. In the present invention, this is addressed by setting up data descriptors which describe or characterize the data as the compiler is emitting the compiled program or the runtime library describes as it is allocating it. When the compiler wants to perform a particular operation on a piece of data, it calls a check routine to verify that the operation is valid for that piece of data. In a preferred embodiment, this is done by storing a database of the data descriptors, from which the compiler can determine legal operations for the individual data members. Instead of losing valuable information when going from source code to compiled program, therefore, the compiler stores the valuable information in the descriptor database so that it may be employed for locating errors in program code.

Additionally, in the system of the present invention, the "life" of data is tracked in the system, including where the data was allocated and where the data was freed—the particular sequence of calls which led to the current state of the data. For instance, if a programmer attempts to "free" (i.e., de-allocate) a memory block twice, the system can indicate exactly where the block was allocated and where the block was freed, in the source code. This greatly simplifies the task of the programmer in tracking down and eliminating the source of the error.

For objects which can be allocated and freed (e.g., file handles, window resources, memory blocks, and the like), the system tracks allocation/de-allocation in an allocation database. When an object is first allocated, the system creates a record for the database, indicating that the object has been allocated. When the object is freed by the programmer, the system of the present invention, instead of returning the object back to the operating system and forgetting about it, keeps a record of the freed object. Upon the next attempt to use the object (e.g., as an argument to a function or another attempt to free the object), the system of the present invention looks up the object to see whether it has been previously freed and, thus, whether the currently-requested operation is illegal. When the object is freed and placed in the database of freed (i.e., illegal) objects, the system of the present invention records exactly where (i.e., in the source code) the object was freed, together with the call sequence which led to the object being freed. Upon encountering an attempted illegal use at runtime, the system of the present invention can dump a log indicating the exact source of the error, or, if the user is executing the program within the Integrated Development Environment, display the offending line of source code which gave rise to the error.

DETAILED DESCRIPTION OF A PREFERRED EMBODIMENT

General Architecture

A. System Hardware

Figure 1A:
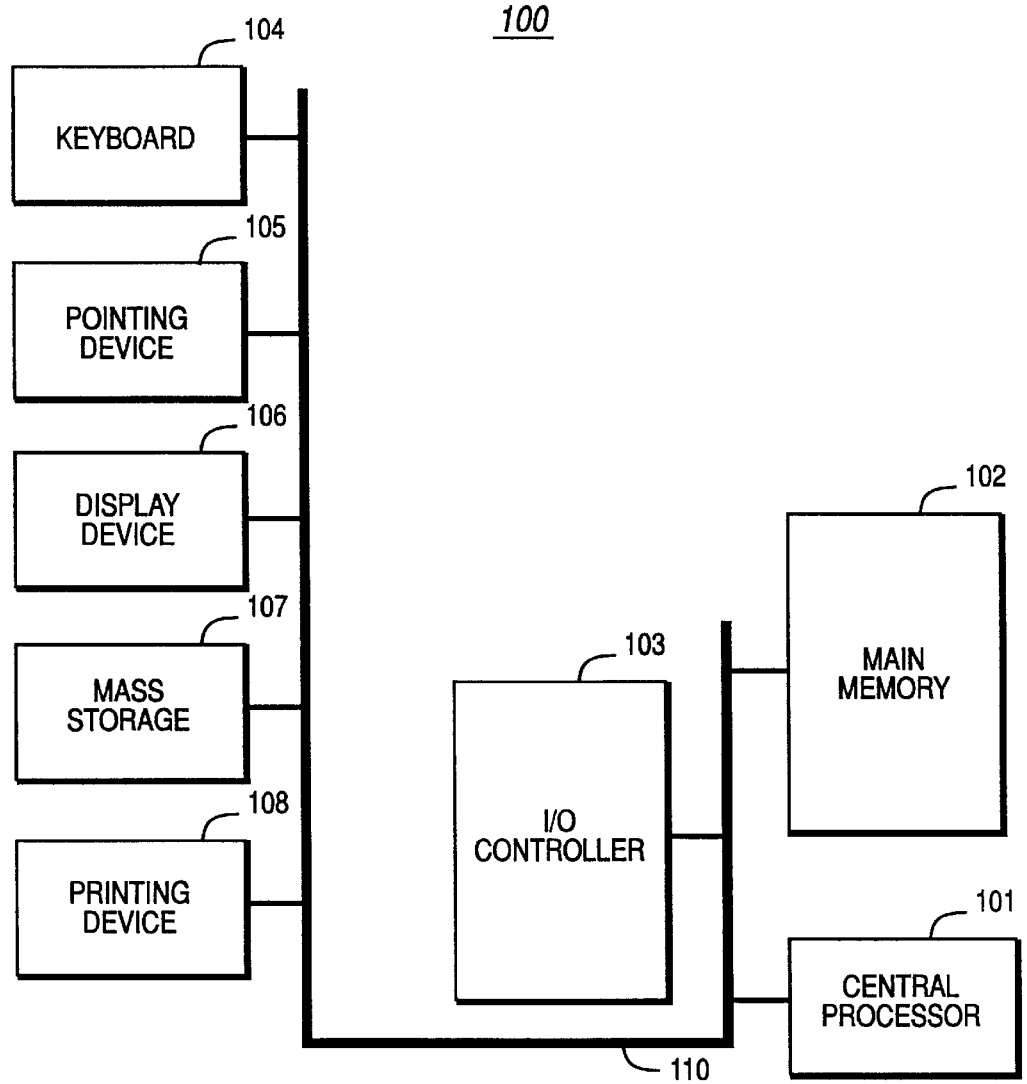
FIG. 1A is a block diagram of a computer system in which the present invention may be embodied.

The present invention may be embodied on a computer system such as the system 100 of FIG. 1A, which includes a central processor 101, a main memory 102, an input/output controller 103, a keyboard 104, a pointing device 105 (e.g., mouse, track ball, pen device, or the like), a display device 106, and a mass storage 107 (e.g., removable disk, fixed disk, optical disk, and the like). Additional input/output devices, such as a printing device 108, may be provided with the system 100 as desired. As shown, the various components of the system 100 communicate through a system bus 110 or similar architecture.

B. System Software

The following description will focus on a preferred embodiment of the present invention (and certain alternatives) operative in an event-driven system, such as the Microsoft® Windows environment. The present invention, however, is not limited to any particular application or any particular environment. Instead, those skilled in the art will find that the system and methods of the present invention may be advantageously applied to a variety of platforms and environments, whether command-line or GUI based, including MS-DOS, Macintosh, UNIX, NextStep, and the like. Therefore, the description of the exemplary embodiments which follows is for purposes of illustration and not limitation.

Figure 1B:
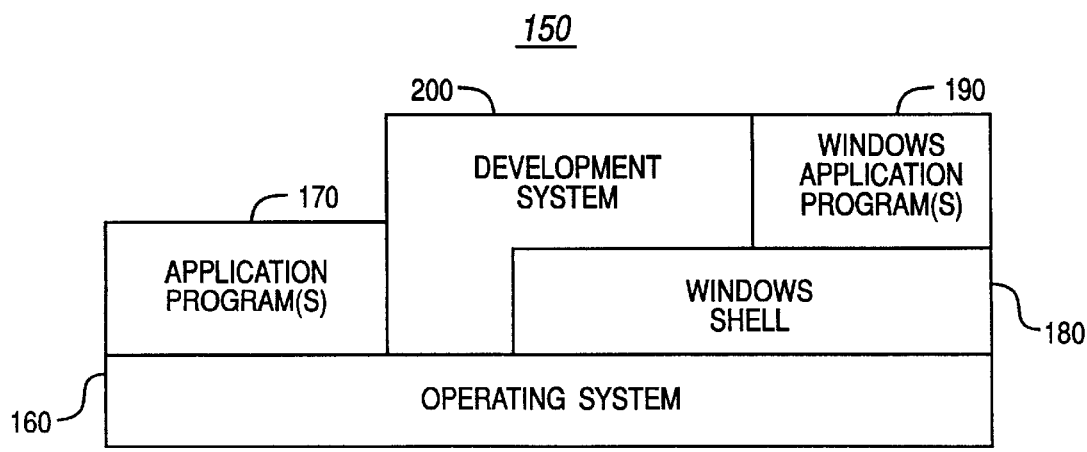
FIG. 1B is a block diagram of a computer system for programming and controlling the operation of the computer system of FIG. 1A.

Illustrated in FIG. 1B, a computer software system 150 is provided for programming the operation of the computer system 100. Software system 150, which is stored in system memory 102 and/or on disk memory 107, includes a kernel or operating system (OS) 160 and a windows shell or interface 180. One or more application programs, such as application programs 170 or windows applications programs 190, may be "loaded" (i.e., transferred from storage 107 into memory 102) for execution by the system 100. OS 160 and shell 180, as well as application software 170, 190 include an interface for receiving user commands and data and displaying results and other useful information. Software system 150 also includes a development system 200 of the present invention for developing system and application programs. As shown, the development system 200 includes components which interface with the system 100 through windows shell 180, as well as components which interface directly through OS 160.

In a preferred embodiment, the system 100 includes an IBM-compatible personal computer, available from a variety of vendors (including IBM of Armonk, N.Y.). Operating system 160 is MS-DOS and shell 180 is Microsoft® Windows, both of which are available from Microsoft Corporation of Redmond, Wash. Alternatively, the system 100 may be implemented in other platforms, including Macintosh, UNIX, and the like. Development systems 200 include Borland®0 C++, available from Borland International of Scotts Valley, Calif. Application software 170, 190, on the other hand, can be any one of a variety of application software, including word processing, database, spreadsheet, text editors, and the like.

C. Development System

Figure 2:
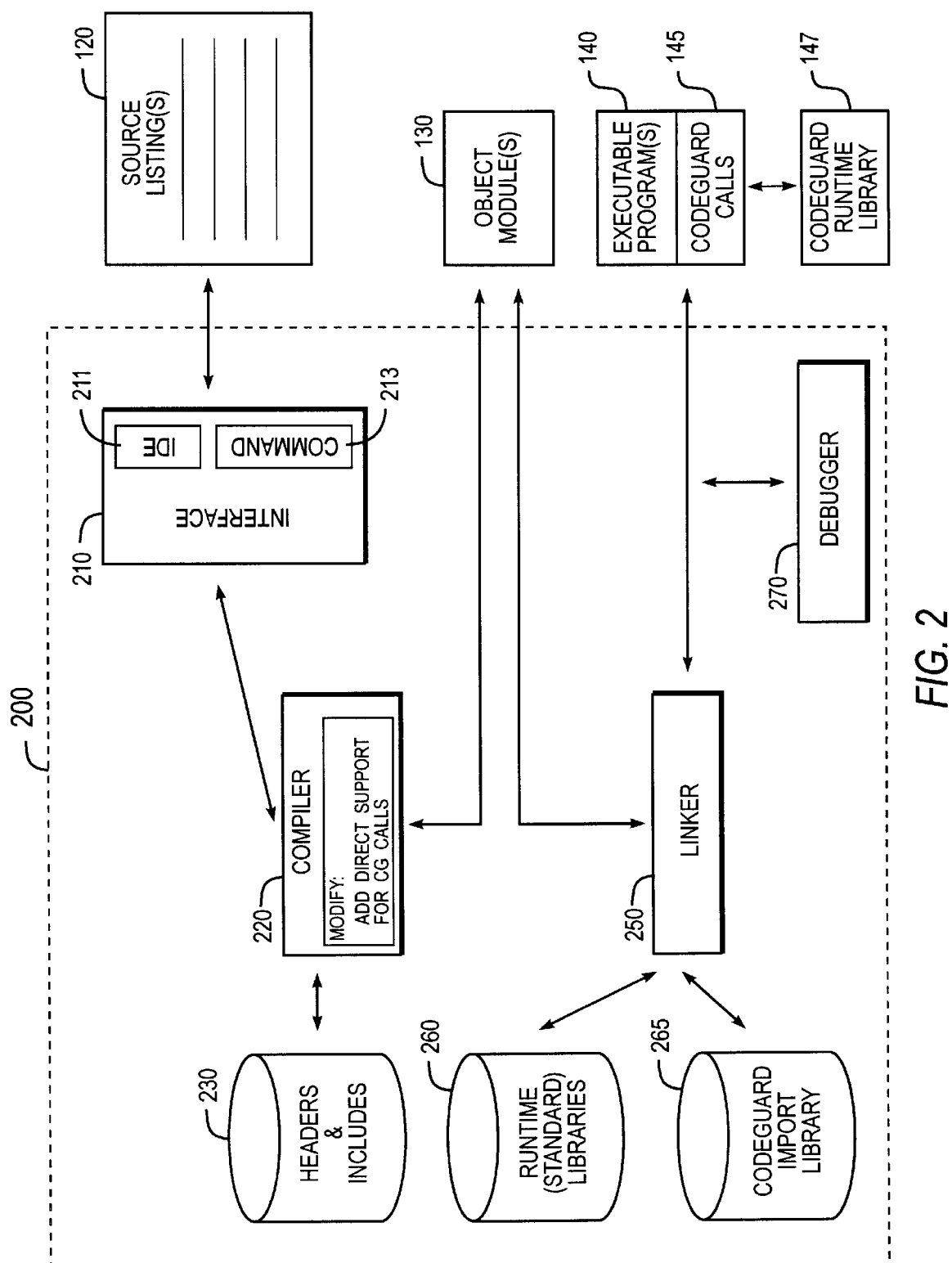
FIG. 2 is a block diagram of a development system of the present invention, which includes a compiler, a linker, and an interface.

Shown in further detail in FIG. 2, the development system 200 of the present invention includes a compiler 220, a linker 250, and an interface 210. Through the interface, the developer user supplies source modules 120 to the compiler 200. Interface 210 includes both command-line driven 213 and Integrated Development Environment (IDE) 211 interfaces, the former accepting user commands through command-line parameters, the latter providing menuing equivalents thereof. From the source code or listings 120 and headers/includes files 230, the compiler 220 "compiles" or generates object module(s) 130. In turn, linker 250 "links" or combines the object modules 130 with runtime libraries 260 (e.g., Standard C runtime library functions) to generate program(s) 140, which may be executed by a target processor (e.g., processor 101 of FIG. 1A). The runtime libraries 260 include previously-compiled standard routines, such as graphics, I/O routines, startup code, math libraries and the like. A description of the general operation of development system 200 is provided with Borland® C++, available directly from Borland International. Additional description is provided in commonly-owned U.S. Pat. No. 5,481,708, issued Jan. 2, 1996. Further description of the linker is provided in commonly-owned U.S. Pat. No. 5,408,665, issued Apr. 18, 1995. The disclosures of each of the foregoing are hereby incorporated by reference.

When the system is (optionally) operating in a "code guarded" mode, the linker 250 links the object modules 130 with CodeGuard® Library 265 to generate "code guarded" program(s) 140. Specifically, the API (Application Programming Interface) calls to the runtime libraries are "wrappered" by CodeGuard wrapper functions. Appropriate CodeGuard header files and CodeGuard Import Library are provided for permitting linking to the CodeGuard wrapper functions. Additionally in this mode, operation of the compiler 220 is altered to insert calls from the user code (e.g., compiled user code in object modules 130) to the CodeGuard Runtime Library 147, for checking runtime use of resources and memory. In a preferred embodiment, the CodeGuard Runtime itself is typically provided as a dynamically-linked library (i.e., "DLL"). Construction and operation of CodeGuard® Library, as well as modification of the compiler 220 for providing direct CodeGuard support, will now be described in further detail.

Runtime Detection of Memory and Resource Errors

A. Introduction

Today, most commercial development is done in the C programming language. From its inception, the C programming language is a "loose" language. Specifically, it is a language which does not perform much checking and, in fact, is designed to do minimal checking. Although this aspect of C is a significant advantage to many developers (e.g., it does not burden developers with a lot of error checking), this "looseness" of C leads to a whole class of problems. In the Pascal environment, in contrast, runtime range checking (e.g., of arrays) is provided. Additionally, in Pascal, string comparisons are compiler generated; they are not generic string comparison routines, such as found in C. Despite the problems created by the laxness of C, it remains the programming language of choice for professional developers.

The present invention recognizes that it is far easier for a programmer to deal with an error if it is caught at the location where it occurs—that is, at the original line of code which gave rise to the problem in the first place. A principal design consideration in the system of the present invention, therefore, is that errors are found immediately as they happen, so that the original offending site can be determined. Compilers are generally good at catching all types of programmer errors. There remains a class of problems, however, that cannot be caught at compile time. These are errors which are syntactically correct yet, at runtime, lead to an error in program execution.

B. General Design

In a preferred embodiment, the CodeGuard Library in the system of the present invention provides for rigorous validation of memory and resource operations. The library is employed at runtime for runtime validation, as well as at compile time, so that the compiler can validate the object which it is working on. As a result, in a preferred embodiment, the development environment is modified at two locations providing the support, as the runtime libraries and at the compiler.

Of particular interest to the present invention are all program objects which "allocate" resources and "free" resources, as well as objects which use those resources. As a result, use of the runtime libraries is of particular interest, since the vast majority of functions (e.g., standard C functions) allocate resources, free resources, and/or use those resources. Functions which copy strings are typical in this regard. For instance, the standard string runtime library functions (i.e., string Standard C library) process strings which are "resources." Consider, for example, the operation of copying one string (i.e., some number of characters) into a particular (destination) string, using a standard library string copy function. First, the string is allocated; this is monitored by the system. Next, information (e.g., another string) is copied into the string. Again, the system observes this operation, making sure that too much is not copied into the string and that the specified candidates (i.e., source and destination) are valid in the first place.

A particular category of direct compiler operations exist for which the only way to feasibly catch an error is at the compiler—that is, the compiler must be taught how to catch the error. This category of problems includes direct assignments, such as direct assignments of pointers or of data. This type of problem requires some access to the underlying source code, before underlying symbol information is discarded. Once a program has been emitted as machine code, there is simply no way to catch these types of problems In the present invention, this is addressed by setting up data descriptors which describe or characterize the data as the compiler is emitting the compiled program or the runtime library describes as it is allocating it. When the compiler wants to perform a particular operation of a piece of data, it calls a check routine to verify that the operation is valid for that piece of data. In a preferred embodiment, this is done by storing a database of the data descriptors, from which the compiler can determine legal operations for the individual data members. Instead of losing valuable information when going from source code to compiled program, therefore, the compiler stores the valuable information in the descriptor database so that it may be employed for locating errors in program code.

Oftentimes when dealing with data, one can detect that data is "bad," for instance, when a bad pointer is passed to a string function in the accompanying runtime library. What the developer really wants to know is not that the data is bad but, instead, exactly "where" this data arose which went bad. In the system of the present invention, therefore, the "life" of data is tracked in the system, including where the data was allocated and where the data was freed—the particular sequence of calls which led to the current state of the data. For instance, if a programmer attempts to "free" (i.e., de-allocate) a memory block twice, the system can indicate exactly where the block was allocated and where the block was freed, in the source code. This greatly simplifies the task of the programmer in tracking down and eliminating the source of the error.

For objects which can be allocated and freed (e.g., file handles, window resources, memory blocks, and the like), the system tracks allocation/de-allocation in an allocation database. When an object is first allocated, the system creates a record for the database, indicating that the object has been allocated. When the object is freed by the programmer, the system of the present invention, instead of returning the object back to the operating system and forgetting about it, keeps a record of the freed object. Upon the next attempt to use the object (e.g., as an argument to a function or another attempt to free the object), the system of the present invention looks up the object to see whether it has been previously freed and, thus, whether the currently-requested operation is illegal. When the object is freed and placed in the database of freed (i.e., illegal) objects, the system of the present invention records exactly where (i.e., in the source code) the object was freed, together with the call sequence which led to the object being freed. Upon encountering an attempted illegal use at runtime, the system of the present invention can dump a log indicating the exact source of the error, or, if the user is executing the program within the Integrated Development Environment (211), display the offending line of source code which gave rise to the error.

A particular problem which arises when freeing a memory block is the use of pointers which themselves may remain valid. Consider a block of memory storing pointers which is freed. The pointers themselves (i.e., memory addresses which are stored thereat) may or may not continue to be valid. Nevertheless, the memory block in which they are stored is clearly no longer valid. This gives rise to a particularly difficult problem in that an application program continues operation, apparently without error. At some point in time, however, the freed memory block is eventually overwritten with other data, thus displacing the previously-stored pointers (which the application continued to use from an inappropriate memory block). The problem is particularly implementation-dependent. A program which appears to be operating normally may, after a change to its memory allocator, now exhibit runtime errors. This results because, in this example, there is a change in how the memory block is freed; for example, it may now be overwritten with other data upon freeing.

One approach to avoiding the problem is to have the application overwrite the block before it actually frees the block back to the operating system, for example, by implementing a de-allocator "wrapper" function on top of the existing de-allocator. Such an approach is described in *Writing Solid Code*, Microsoft Press; the disclosure of which is hereby incorporated by reference. In the system of the present invention, this approach is taken further, however. In particular, the system includes a method which generates an incrementally unique code (e.g., 4-byte code) for overriding the memory block. By placing a unique value at each location, the system of the present invention is able to determine exactly where (in memory) the error occurred. The actual data chosen for overriding the memory block is selected such that the data yields bad pointers for the particular platform (which is targeted by the application). The codes are, from block to block, unique, so that the system can discern the location of the error among multiple old memory blocks. In operation, the system can catch not only instances where a bad pointer is employed but also indicate where in memory the bad pointer originated from. Still further, since the system keeps a database of freed objects, the system can indicate to the user the exact line of code where the block of memory was freed which had stored the errant pointer.

In a corresponding manner, when memory is allocated, the system fills the just-allocated memory with "garbage" data, thereby forcing to the surface errors which are hidden as a result of a programmers' (unfounded) assumption of a particular state of memory upon allocation (e.g., that it would be initialized to zeros). When initialization is dictated by the language, such as static and global arrays in C (which, according to the C language, are initialized to zeros), the system does not perform this initialization. In all other instances, however, the initialization (with garbaged data) is made so that the programmer cannot rely on implementation-dependent side effects for correctness of his or her code.

In the system of the present invention, descriptors are stored for each stack frame which is created. It is known in the art to use stack-checking routines to guard against stack overflow or underflow. In addition to this, however, the descriptors include information characterizing the various components which comprise each stack frame—namely, function arguments, local variables, and return address. This may be employed for catching the very common problem of returning (from the function) an address of a local variable in the function (which of course is no longer valid to de-reference once the function has returned and its stack frame has been destroyed).

C. Modification of Runtime Library

For the runtime library, it is desirable to catch errors which include passing bad pointers/handles to runtime library functions as well as attempting to use objects (e.g., memory blocks) which have already been freed. In an exemplary embodiment, each runtime library function is provided with a "wrapper" function, which provides an additional level of checking before the true runtime function is actually called (to carry out the functionality which is desired). In this manner, the standard runtime library itself requires little change. Instead, change can be effected through the wrapper functions which include parameter checking and validation functionality. The wrapper functions themselves may be implemented in a separate DLL (Dynamically-Linked Library). In this fashion, the application calls into the wrapper DLL which, after error checking and validation, calls into the true runtime DLL.

At compile time, the compiler builds a descriptor for each global and for each stack data member which it encounters. This information is emitted to the data segment (or, alternatively, to the code segment) of the object file (i.e., .OBJ file). For this purpose, static data members are treated the same as global data members: descriptors are emitted for them as well. Each descriptor itself stores the location for the data member in memory together with a size for that data member.

For stack data members, the descriptor stores essentially the same information as just described. However, the location for each data member is indicated as offsets within the stack. Another difference exists with stack data members. The CodeGuard Library is not notified of the existence of particular stack data members. For static and global data members (for which the compiler emits descriptors to the data segment), on the other hand, the CodeGuard Runtime Library is notified. The compiler generates for each object module which includes global and/or static data an initialization procedure, which calls into the CodeGuard Runtime Library. The initialization procedure for each module is invoked by the CodeGuard Runtime Library at application startup (i.e., execution); here, the CodeGuard Library walks a list of initialization procedures for each object module linked into the final executable program. The initialization procedure itself is compiled into the object file for each object module which includes global and/or static data members. The procedure itself is actually written out as pure data to either the code segment and/or data segment of the object module.

Upon invocation, the initialization procedure is passed on a per object module basis a pointer to the list of descriptors (for that object module). Upon invocation by the CodeGuard Library, the invocation procedure may call back into the CodeGuard Library with a notification of data blocks in the object module (i.e., address, size, and padding). The CodeGuard Library, in turn, enters these items into its database of allocated objects. In essence, these items are treated as implicitly allocated objects—having been implicitly allocated by the application program loader.

For stack-based objects, a callback mechanism is not used. Instead, the standard function prologue code is modified as follows. When the function is entered, it pushes onto the stack offsets (and signatures) for the descriptors of the current stack frame. In this manner, when a particular pointer is being validated for a runtime library function, the system can "walk up" the stack and find the corresponding signature, thus allowing the system to find the offset to the descriptor for the stack. In an exemplary embodiment, a 32-bit space is reserved on the stack for storing the signature.

Runtime or dynamic allocation is handled differently, using "wrappers" on standard library allocation function. For memory allocation, for instance, the malloc function is wrapped. For file handle resources, on the other hand, the fopen function is wrapped. Collectively, these are treated generically as allocation of "resources." Within this generic class exists types of resources, including memory, file handles, streams, windows, GDI objects (e.g., Graphics-device independent—such as Windows pen), and the like. Whenever one of these "resources" is allocated, the CodeGuard Library enters it into its database of allocated objects.

Whenever such a resource is de-allocated or freed, the CodeGuard library removes it from its database of allocated or "legal" objects and places it in its database of "illegal" objects.

Actual knowledge about what each resource represents is contained within the wrapper for each of the runtime library functions. When a file handle is passed to open a file (i.e., passed to fopen), for instance, the CodeGuard wrapper function makes the following determination: (1) whether this is the right type of object, and (2) whether it is valid. In particular, the wrapper function can make this determination by looking up the passed-in data member in its list of valid objects. For instances where an allocator function is being called (i.e., a function which will return a particular value for the resource which is being allocated), the wrapper function, on the return (i.e., the return from the true runtime library function), stores the value in its database of allocated objects and then returns the value back to the user application.

In addition to checking resources at allocation and de-allocation, the system also checks "use" of resources at runtime. This is accomplished by two means. First is the compiler support, which is previously described (and described in further detail below). Second is the use of wrapper functions for the individual RTL functions which "use" the resources. For memory block resources, for instance, the corresponding RTL string functions strcpy and strncmp are wrappered, with the wrapper function validating the passed-in memory pointers which reference particular memory blocks (i.e., resources). At times, resources may be mixed, such as in the case of RTL functions fread and fwrite. In the case of fwrite, the function takes a buffer (i.e., memory pointer to a buffer) which is going to be written out and a FILE pointer which is the file to receive the output. Here, two different types of resources are validated: a memory block and file pointer. Additionally, the CodeGuard Library validates all other parameters, to the extent it can. For instance, if the constant string "my_file" is passed to the fopen function, the CodeGuard Library checks to make sure that the string is a valid string.

Internal Operation

A. Approach Based on Object Type

From the viewpoint of implementing the present invention, essentially two types of objects or things exist in the system: memory and non-memory resources. Non-memory resources generally always include an allocator and a de-allocator (or destroyer). For non-memory resources, in other words, there typically exists a place where the resource is created (e.g., fopen) and a place where it is destroyed (e.g., fclose). Therefore, the creation and destruction of non-memory resources are usually well-defined events in the system.

Memory, in contrast, can come from a variety of places. As a result, it requires special treatment and, thus, special checking. Memory can come, for instance, from the operating system (from an RTL allocator), from static data in one's code, or from stack (local) variables in one's code. All told, when the system checks a resource, it must handle two classes of objects. Either it is a memory object and requires special checking, or it is a non-memory resource whose creation and destruction can be specifically determined. As a result of these classes of objects, the CodeGuard Library includes two classes or types of checks.

The types of objects which are not memory may be treated generically and handled in basically the same manner. The only issue specific to each of these objects is what is its "type". In an exemplary embodiment, theses objects include file handles, system handles (e.g., semaphores and mutexes), windows objects (e.g., pen, brushes, and icons), and the like. The system includes a notion of a generic handler, where the system treats an object as a generic object—that is, it does not attempt to understand its type. Nevertheless, the object may be tracked to monitor when it is created and destroyed. In operation, a descriptor for a resource is created on-the-fly, when the resource is acquired at runtime. In this manner, descriptors are not created for resources which are set forth in the code but are not employed at runtime.

B. Resource and Memory Block Retention

When a memory block is freed by the user application at runtime, the CodeGuard Library does not immediately return it back to the runtime library allocator. Instead, the CodeGuard Library "holds onto" the memory block, in an effort to force a subsequent memory request from the user application to be satisfied from a different memory block. During operation, if a user application frees up a block and then immediately requests another block, it is possible that a runtime allocator might return the very same block back to the user, thus hiding a certain class of bugs. By delaying the return of freed memory blocks, the CodeGuard Library forces the user application to go elsewhere for memory, the application cannot grab the very same memory block back which it has just freed. In addition to the "delayed freeing" of blocks, the system also fills freed blocks (i.e., "freed" from the applications perspective) with garbage data. In this manner the system can provoke problems up front and thus allow them to be fixed, instead of allowing them to remain dormant only to then create program errors when a program is ultimately deployed to customers.

C. Wrapper Functions

Exemplary wrapper functions for implementing the present invention will now be presented. First, the memory class of wrappers will be presented, followed by the non-memory wrappers.

1. General Approach to Memory Objects

The general approach to construction wrapper functions, in accordance with the present invention, is perhaps best described by way of example. Consider the standard C library function, strcpy:

char*strcpy(char*dest,const char*src);

Here, the function copies string src to dest, stopping after the terminating null character has been moved. In accordance with the present invention, both arguments are validated.

The process of validation is performed using a descriptor database of the present invention. At the outset, the system notes that the strcpy function takes as arguments two pointers to memory. Accordingly, the memory resides on the stack, in the heap, or in the application's data segment. Thus, in all cases, the corresponding memory (i.e., the memory pointed to by the pointers) can be found. First, the system checks items on the stack. If the pointer points to a memory location within the current stack frame (or within the range of the stack), the system looks to the location in the stack which points to the descriptor that pertains to that pointer. When the associated descriptor is found, the system compares the length specified by the descriptor (i.e., the size of the memory block) against how much information is to be copied (for the strcpy function). If the amount to copy fits within the determined size of the block, the parameter (i.e., pointer) is valid.

If, on the other hand, the pointer contains a value such that the memory could not possibly be on the stack, the system looks to its descriptor database. In other words, if the descriptor cannot be found from the stack at this point, the system ignores the stack frame and looks to its descriptor database. In operation, when a function is being called and its stack frame is set up, the system pushes onto the stack an offset to the stack frame descriptor (i.e., the descriptor which describes the local variables for that stack frame) and pushes a "signature"—a 32-bit constant which serves as a signature value. In the event that an object exists on the stack yet a descriptor for it cannot be found on the stack, the system takes a simplified approach as follows. Since the object cannot be validated, the system simply treats the object as a valid object. This approach is adopted since it is preferable to minimize false positives, so as not to interfere with normal development process. An object will generally not have a descriptor if the user (selectively) decides to not enforce CodeGuard checking for certain functions. In this manner, code can be mixed, using both code guarded and non-code guarded functions. Giving false positives is a particularly bad approach since it increases the likelihood that users will tend to ignore future warnings, some of which may be quite important. In addition to insuring that sufficient memory space exists for the string copy operation, the system also checks whether the destination is "writeable." Writeable locations include the stack, the heap, and the application's data segment, for instance. Non-writeable locations, on the other hand, include the code segment and the data segment of another program.

To validate the size of the string copy to the destination, the wrapper function first performs a strlen (string length) function, checking for the size of the source. After making this determination, the wrapper can then insure that the destination (memory object) includes sufficient space for storing a string of this length. Although the system actually knows the size of the source (memory block object), the string length is determined instead, since a string (which is NULL-terminated) may be copied which is less than the (complete) size of the source memory block. For the destination, the wrapper function first looks to a descriptor stored on the stack. If one is not found, it then proceeds to the descriptor database, for looking up a descriptor corresponding to that memory object. If a descriptor is found, the wrapper simply validates that the requested operation (i.e., copying a certain number of bytes) can be performed with the object at its given size (as indicated by the descriptor).

For stack-based objects (strings residing on the stack), the system of the present invention places the corresponding descriptors also on the stack. This is a design optimization intended to minimize the number of calls into the CodeGuard Library. Instead, a reference to the descriptor information is simply kept in the same stack frame as the corresponding objects; the actual descriptor for each stack frame is, itself, stored in the code segment. In this manner, stack-based objects can be checked without calling into the CodeGuard Library every time a stack frame is entered.

If after validation, the source and destination are found to be valid for the desired operation, the wrapper function calls the runtime library function (i.e., strcpy itself). If an error is found, on the other hand, the CodeGuard Library draws attention to the error, such as logging the event and/or displaying an alert dialogue. In a preferred embodiment, the wrapper function usually still calls into the corresponding standard library function even when an error is detected (except in the instance of freeing a memory block twice). This is to allow operation of the program to be observed even in the face of a potential error. Thus, in a preferred embodiment, the approach is one of detection but not exception handling (which can be provided by other libraries). In the event that a program does "crash" because of an error which has been detected, the cause of the crash is pinpointed by the above-described log information, which is stored to disk. If the application is running under IDE control (as previously described), the system displays the offending line of code where the errant runtime library call occurred.

Differences exist between descriptors for stack-based (local) variables and global ones. These differences are due, in part, to the difference which exists between these two types of variables. Within C++ functions, for instance, local variables can be nested. Specifically, within a function, a block may exist (e.g., "if" statement) which declares additional local variables (i.e., within the scope of that block). When the point of execution passes out of that particular block, the data members whose scope was limited to that block should be treated as no longer valid. Technically, access to these "nested" local variables which are no longer in scope should not be permitted.

Consider a function which declares a pointer to the integer and the function includes a block (e.g., "if" statement) which declared a local integer variable, with the address of that variable being assigned to the integer pointer within the block.

```
void foo( int iParam )
{
        int* pMyInt;        // ptr to int
        if ( iParm > 0 ) {
                int MyInt;              // declar int within "if" block
                pMyInt = &MyInt;        // assign addr of MyInt to pMyInt
        }
        *pMyInt = 5;        // wrong -- dereference thru MyInt no longer valid!
}
```

Here, when execution of the function passes out of the "if" block, the local variable (i.e., MyInt) technically no longer exists—it does not represent legitimate memory any more. The fact that there exists a pointer pointing to that memory block, however, is potentially problematic. If, for instance, the pointer is dereferenced for accessing the now-gone integer (e.g., for an assignment operation, as shown), an error would occur. The stack descriptors are designed to encompass information about multiple nested scopes. In this manner, the descriptors can indicate the feasibility or lifetime of nested local variables.

The above description of strcpy illustrates that the general sequence of validation steps is applicable to memory objects generally. In other words, the foregoing represented a generic sequence of validation. Specific validation sequences—specific to a particular RTL function—will now be described.

2. Specific Approach to Memory Ojbects—strcpy

Construction of wrapper functions for string RTL functions is exemplified by strcpy, which may be constructed as follows (using the familiar C/C++ programming language).

```
1:   /*
2:    * strcpy wrapper
3:    */
4:
5:   char _FAR *      _export       _cg_strcpy(
6:                    char _FAR * (*_org_strcpy) (char _FAR *_dest,
7:                    const char _FAR * _src), unsigned int prevEBP,
8:                    void * retEIP,
9:                    char _FAR * _dest, const char _FAR * _src)
10:  {
11:          static FUNCTION func_strcpy
12:                  = {"strcpy",_cg_strcpy,F_FUNC_ALL, "ps=p", 0};
13:          char _FAR * r;
14:          size_t srcLen;
15:
16:          if(off||inRTL()||isDisabled(&func_strcpy))
17:          {
18:                  _SWITCHTORTLDS;
19:                  return _org_strcpy(_dest, ___src);
20:          }
21:
22:          srcLen = validateString(_src, 0, &func_strcpy, rt1EBP);
23:          validate(_dest, srcLen, &func_strcpy, rt1EBP);
24:
25:          enterRTL();
26:          _SETRTLDS;
27:          r = _org_strcpy(_dest, _src);
28:          _RESTOREDS;
29:          leaveRTL();
30:
31:          apiRet(&func_strcpy ,rt1EBP, (unsigned long) r);
32:          return r;
33:  }
```
(line numbers added to faciliate description)

The strcpy wrapper is substituted for each call to strcpy in the "code guarded" program. A stub named "strcpy" is employed which passes the "real" strcpy address along to the above wrapper for strcpy. For strcpy, the system provides: strcpy,_cg_strcpy, and _org_strcpy functions Calls to the function strcpy( ) in the user's program code get resolved to the CodeGuard® version of strcpy which pushes the address of _org_strcpy (the RTL strcpy) and then calls _cg_strcpy. The prevEBP and retEIP parameters are already on the stack from the call to the strcpy wrapper.

The specific steps performed by the the wrapper function or method are as follows. At line 11, descriptor information is stored for the function, including: (1) name of the function, (2) relevant CodeGuard function, (3) flags (e.g., indicating what to check), (4) string descriptor describing the parameters (i.e., what the parameter types are, with respect to checking—used for parsing the function arguments when displaying warnings or errors), and (5) extra data member. After declaring two other local variables at lines 13–14, the function proceeds to line 16 to test two conditions. First, the function tests whether CodeGuard checking has been disabled (in which case the wrapper function is to do no checking). Second, the function tests whether execution is currently inside an RTL function which has then called the strcpy function. If the strcpy function has been called from another RTL function, no further checking should occur (i.e., by this wrapper), as checking has already occurred. If either of these cases holds true, the method simply calls into the original version of the strcpy function and then returns, as shown at line 19.

If, on the other hand, this is a call from some user code, then the wrapper function performs certain checks. First, at line 22, the function validates that the source that is being passed in is a valid string. This is done by invoking a validateString function, passing the "pointer to" source string together with the descriptor for this function (i.e., the strcpy function). Also passed in is the stack frame pointer—where to start looking (in the instance where the source string lives on the stack). As shown, this returns the length of the source string to a local variable, srcLen. This length may, in turn, be employed to validate the destination. This is shown at line 23, with a call to a validate routine.

Actual validation of the destination is done by a generic validate function, at line 23. The function takes as its first parameter a pointer to the memory block to validate (i.e., the destination string) together with a size for the block (here, the same number as the length of the source string). The last two arguments to the validate function are the same as those previously described for the validateString function: a strcpy descriptor and a pointer to the stack frame. The validate routine makes sure that the destination is sufficiently large to receive a string of size srcLen. Appended herewith as Appendix B are source listings demonstrating exemplary embodiments of validate and validateString.

At line 25, the method invokes a routine, enterRTL for setting a flag indicating the execution is currently within the RTL (i.e., to avoid re-entry). This is followed by a call to the original strcpy function, at line 27. In other words, the "real" strcpy function call into the runtime library is _org_strcpy, which occurs at line 19 and line 27. For 16-bit implementations, macros are added for switching the data segment (DS) register to the DS of the runtime library, as shown at lines 26 and 28. When the call returns from the original strcpy, the data segment can be restored, as shown at line 28. Thereafter, at line 29, the function calls leaveRTL for indicating that execution has now returned from the RTL library (i.e., resetting the re-entry flag). At line 31, the return value (r) is logged, for keeping a record of the result of the function call. This provides the system with the ability to log the results of all function returns. Finally, the wrapper function returns to the client the result, r, at line 32.

Corresponding wrappers for other string functions, such as strncpy, are essentially identical to that of the above except that the function descriptor is set to that for the particular RTL function. Collectively, these are wrappers for items which access or touch resources—reading from and writing to resources.

3. General Approach to Allocators and Destroyers

The allocators and destroyers (de-allocators) follow a slightly different model. The general approach for these wrappers is as follows. First, they check any parameters (e.g., FILE pointer to fopen). Next, these wrappers call into the original (corresponding) RTL functions. In the instance of an allocation (e.g., malloc), the call is made with the number of bytes required. The result obtained—a pointer or a handle to a resource—is logged as a new resource (of a particular resource type). Finally, these wrappers check to see whether a failure occurred during the actual API call into the RTL library. This is reported to the user (if desired), in the manner previously described. Finally, the resource (e.g., pointer or handle) is returned to the user.

4. Specific Approach to Resource (File) Allocators and Destroyers

These principles may be illustrated by examining implementations of wrapper functions for fopen and fclose. In contrast to items which use resources (e.g., string functions), things which allocate and free resources require more checking and, thus, larger wrapper functions. In an exemplary embodiment, a fopen wrapper function may be constructed as follows.

```
 1:  /*
 2:   * fopen wrapper
 3:   */
 4:
 5:  FILE * _export    _cg_fopen(
 6:  FILE * (*_org_fopen) (const char * _path, const char * _mode),
 7:  int (*_org_fclose) (FILE * _stream),
 8:  int (*_org_errno_help) (int setErrno),
 9:  int (*_org_close) (int _handle),
10:  unsigned int prevEBP,
11:  void * retEIP,
12:  const char * _path, const char * _mode)
13:  {
14:  static, FUNCTION func_fopen={"fopen",_cg_fopen,F_FUNC_ALL, "ss=p",0};
15:  FILE * r;
16:
17:  if (off||inRTL())
18:  {
19:          _SWITCHTORTLDS;
20:          return _org_fopen(_path, _mode);
21:  }
22:
23:  validateString(_path, 0, &func_fopen, rt1EBP);
24:  validateString(_mode, 0, &func_fopen, rt1EBP);
25:
26:  enterRTL();
27:  do
28:  {
29:          _SETRTLDS;
30:          r = _org_fopen(_path, _mode);
31:          _RESTOREDS;
32:  } while (r==NULL && geterrno==EMFILE && freeDelayed(&rsrc_fstream));
33:  leaveRTL();
34:
35:  if (r!=NULL)
36:  {
37:          ITEM _FAR * i;
38:          ITEM _FAR * ih;
39:
40:          i = newResource( (unsigned long) r,
41:                          &rsrc_fstream,_org_fclose,&func_fopen,
42:                          rt1EBP );
43:
44:          if (i==NULL)
45:          {
46:              _SETRTLDS;
47:              _org_fclose(r);
48:              _RESTOREDS;
49:              seterrno(ENOMEM);
50:              apiFail(&func_fopen, rt1EBP, NULL);
51:              return NULL;
52:          }
53:
54:          ih = newResource( (unsigned long)_fileno(r),
55:                          &rsrc_handle,_org_close,&func_fopen,
56:                          rt1EBP );
57:          if (ih==NULL)
58:          {
59:              _SETRTLDS;
60:              org_fclose(r);
61:              _RESTOREDS;
```

-continued

```
62:            if (i->par1) free((char*) i->par1);
63:            freeResource(i);
64:            seterrno(ENOMEM);
65:            apiFail(&func_fopen, rt1EBP, NULL);
66:            return NULL;
67:        }
68:
69:        i->par1 = (unsigned long) strdup(_path);
70:        i->par2 = (unsigned long) ih;
71:        ih->par1 = (unsigned long) strdup(_path);
72:        apiRet(&func_fopen, rt1EBP, (unsigned long) r);
73:    }
74:    else
75:    {
76:        apiFail(&func_fopen, rt1EBP, NULL);
77:    }
78:
79:    return r;
80: }
```

At line 14, the wrapper function declares a (static) descriptor for the function, in a manner similar to that previously described for the strcpy function. The descriptor at line 14 indicates that execution is currently in the "fopen" function. At line 15, a local FILE pointer variable is declared. The function then proceeds to check, at line 17, whether it should continue checking or simply just call into the original fopen function. In a manner similar to that previously done for the strcpy wrapper function, if Code-Guard checking is turned off or execution already is within the RTL, as tested at line 17, the method simply calls the original fopen function at line 20 and returns. Otherwise, the wrapper function continues with checking as follows. At line 23, it validates the string for the "path" (i.e., the path to the file). In a similar manner, at line 24, the wrapper function validates the "mode" string (i.e., the "mode" specified for the standard C fopen function).

At line 26, the wrapper function indicates that it is entering the RTL, by calling the enterRTL subroutine which sets a flag as previously described. Thereafter, the wrapper function enters a "do/while" loop for calling the original fopen function. The call to the original fopen function can fail for a number of reasons. It can fail for a "legitimate" reason (i.e., non-programmer error), such as when the intended file no longer exists (on the storage device). On the other hand, it may fail because of an error in program logic in how the resource is used.

A particular problem can arise where erroneous code continues to execute because a handle which is freed is then immediately returned for use upon the next request for a handle. To bring such a problem to light, the system of the present invention employs a "delayed free" approach. To keep the user from getting the same file handle back, when a file is "closed" in the user program the file is actually closed. Then, however, the CodeGuard Library immediately reopens the file and places it on the "delayed free" list, thus keeping it from the RTL. In other words, the file is reopened in a way which the RTL does not know about. As a result, a subsequent call to fopen will not return the just-freed file handle. With this approach, the call to fopen will fail in instances where user code inappropriately relies on the return of the same handle. Since the system forces a different file handle to be used, the user code no longer works properly anymore, thus bringing the problem (of inappropriate file handle use) to the forefront.

Since closed files placed on the "delayed free" list are not available, a call to fopen may fail because all the file handle are used. However, the system does not want to fail simply because it has kept items on its delayed free list. Therefore, the "while" statement at line 32 will continue to free up resources on the delayed free list, so long as such resources exist and the original fopen function fails. This is done only in the case, however, where the failure occurs for lack of file handles. Eventually, either a valid file handle or NULL is returned by the call to the original fopen function. At this point, the function pops out of the loop and proceeds to line 33. There, the routine leaveRTL is invoked for resetting the RTL entry flag.

If a legitimate file handle is obtained (i.e., it is not equal to NULL), tested at line 35, the function then records the resource in its database of legal objects, as shown at line 40. Specifically, the wrapper function calls a routine, newResource for recording the resource. The routine is passed, the result "r", a descriptor indicating what type of resource it is (here, a "stream"), and the "owner" of the resource. The owner of the resource is the function which is responsible for closing the resource; for file handles, the owner is fclose. The fclose function is now the function expected to destroy the resource. In other words, the "owner" is the "closer." Finally the newResource routine is also passed a descriptor for the RTL function (i.e., fopen) and the pointer to the stack frame (as previously described). The stack pointer is used here so that the system can save away a call tree, for recording the fact that a particular file handler is allocated at a particular code position with a particular calling sequence. At a later point, upon occurrence of an error, it is this information which is used to walk up the tree for determining exactly where this resource was allocated. If the system cannot log the file handler as a new resource, tested at line 44, the wrapper function returns the file handle (by calling fclose at line 47), sets the operation to fail at line 50, and then returns NULL at line 51. This scenario generally will not happen; however, the test is included for defensive purposes.

The fopen function, because of the way it is implemented in the C programming language, is actually treated as creating two resources. A file stream contains two things: a file stream (proper) and a file handle. In the RTL, the file handle can be extracted and passed to other functions. For this reason, fopen in treated as creating two resources.

The new resource which was recorded at line 40 was actually for the file stream (FILE*). The file handle, on the other hand, is recorded as a second resource, at line 54, by the second call to newResource. The parameters for this call to newResource are similar to that previously described, except that the first two parameters pass information specific to the file handle. The sequence of steps to validate this resource is similar to that just described at line 34–52 for the file stream resource.

After this second resource is checked, the wrapper function stores in a local buffer useful information about the function call. For instance, the "path" stream is stored, as indicated at line 69 and 71 (for the respective resources). Although this information is ordinarily lost after a call to the standard library fopen function, the CodeGuard library remembers the information, so that it can provide the user with a better description of the resource in the event of an error. Similarly, the return value is logged at line 72. Once the information is recorded, the wrapper can return the result, as indicated by line 79. Lines 75–77 simply indicates when there is an API failure—that is, when the RTL call fails for "legitimate" reasons. At line 76, the wrapper function simply logs the failure. Thereafter, the method proceeds to line 79 to return the result (here, NULL).

Complementing the fopen wrapper function is the fclose wrapper function. In an exemplary embodiment, the wrapper function may be constructed as follows:

```
 1:  /*
 2:   * fclose wrapper
 3:   */
 5:  int      _export     _cg_fclose(
 6:  int (*_org_fclose) (FILE * _stream),
 7:  int (*_org_errno_help) (int setErrno),
 8:  int (*_org_close) (int _handle),
 9:  FILE * (*_org_freopen) ( const char * _path, const char * _mode,
10:                                  FILE * _stream),
11:  unsigned int prevEBP,
12:  void * retEIP,
13:  FILE *    stream)
14:  {
15:  static FUNCTION func_fclose={"fclose",_cg_fclose,F_FUNC_ALL,"p=i",0};
16:  ITEM _FAR * i, *ih;
17:  FILE * h;
18:
19:  if (off||inRTL())
20:  {
21:          _SWITCHTORTLDS;
22:          return _org_fclose(_stream);
23:  }
24:
25:  // checking parameter errors
26:
27:  if (NULL==( i=isGoodRscParam((unsigned long)_stream, &rsrc_fstream,
28:                  _org_fclose, &func_fclose, rt1EBP)))
29:  {
30:          if ( findDelayFreed((unsigned long)__stream, &rsrc_fstream,
31:             _org_fclose))
32:          {
33:             seterrno(EBADF);
34:             apiFail(&func_fclose, rt1EBP, NULL);
35:             return EOF;
36:          }
37:          else // try to fclose (we can't fall thru to delay)
38:          {
39:             int r;
40:             enterRTL();
41:             _SETRTLDS;
42:             r = _org_fclose(_stream);
43:             _RESTOREDS;
44:             leaveRTL();
45:             if (r!=EOF)
46:                 apiRet(&func_fclose, rt1EBP, (unsigned long) r);
47:             else
48:                 apiFail(&func_fclose, rt1EBP, EOF);
49:             return r;
50:          }
51:  }
52:
53:  // fclose and reopen it so others will have access to it!
54:
55:  enterRTL();
56:  _SETRTLDS;
57:  h = _org_freopen("null", "rb", _stream);
58:  _RESTOREDS;
59:  leaveRTL();
60:
61:  ih = (ITEM *) i->par2;
62:
63:  // If we have a valid handle resource (fdopen may not) free it.
64:  if (ih)
65:  {
66:          if (ih->par1)
```

-continued

```
67:             free((char*) ih->par1);
68:          freeResource(ih);
69:     }
70:
71:     if (h==NULL && geterrno==EBADF)
72:     {
73:          if (i->par1) free((char*) i=>par1);
7A:          freeResource(i);
75:          apiFail(&func__fclose, rt1EBP, EOF);
76:          return EOF;
77:     }
78:
79:     // try to take hold of the same handle for delay stuff
80:
81:     if (h!=__stream)
82:     {
83:          if (i->par1) free((char*) i->par1);
84:          freeResource(i);
85:          if (h)
86:          {
87:             __SETRTLDS;
88:             __org__fclose(h);
89:             __RESTOREDS;
90:          }
91:          apiRet(&func__fclose, rtlEBP, 0);
92:          return 0;
93:     }
94:
95:     // resource free (delay free)
96:
97:     delayFreeResource( i, &func__fclose, rt1EBP,
98:                        (unsigned long) __stream, __org__fclose
99:                        __PASS__USERDS );
100:
101:    apiRet(&func__fclose, rtlEBP, 0);
102:    return 0;
103:    }
```

At the outset, at line 15, the wrapper declares a (static) descriptor data member, which stores information describing the fclose wrapper function. At lines 16–17, other local variables are declared. At line 19, the wrapper function performs the previously-described determination of whether CodeGuard is turned off or execution is already within the runtime library (i.e., a re-entrant scenario). In either case, the wrapper function simply calls into the original fclose function and returns, at line 22. Otherwise, CodeGuard checking is indicated and the method proceeds to line 27.

At line 27, the function performs a generic resource parameter check: is this a good resource parameter? This check is analogous to the validateString function (as previously described for string RTL functions) and the validate function (as previously described for memory RTL functions). For the present case of fclose, the resource is a generic resource; it is not memory but, instead, simply a "resource." Here, therefore, the determination is whether it is a good resource, specifically a good fstream resource for fclose. Thus, at line 27, the wrapper function looks up the resource to determine if it is a valid resource. If it is not determined to be a valid resource (i.e., the subroutine call at line 27 returns NULL), the function proceeds to line 30 to make an additional determination. Specifically, at line 30, the function determines if the resource has been previously freed, by calling a findDelayFreed subroutine, passing the resource and function descriptor (i.e., fclose descriptor) as arguments. If the resource is in fact on the delay freed list, a user error has occurred (i.e., the user is attempting to use a resource which has already been freed). In such a case, the wrapper function logs the error and returns a failure value (here, EOF—end of file —for fclose).

If the resource is not on the delay freed list, the function proceeds to the "else" statement at line 37. Within the "else" statement, the function actually calls the original fclose function, passing the resource (stream). Here, particularly, is an example of where the wrapper function attempts to perform what the user wanted even though the resource cannot be validated. This is a rarely used case, but it still allows the CodeGuard library to defer the matter to the actual runtime library (i.e., the original fclose function). The result returned by the original fclose function is, in turn, employed at this point to determine whether the API call succeeded or failed. This result is returned, at line 49.

If the resource parameter was, on the other hand, valid at line 23, the method proceeds to line 55. Here, the resource has been determined to be valid. The function will, therefore, close it and reopen it, by calling the RTL function freopen, at line 57. As shown, the file is actually reopened into the NULL stream. The file handle is not returned to the user, but, instead, is maintained on the delayed-free list. As previously described, the actual RTL call (i.e., to freopen) is sandwiched between the enterRTL function and leaveRTL function (lines 55 and 59, respectively). At line 61, the file resource handle is saved to a local variable, ih. Then, if the resource handle is valid (tested at line 64), the file handle itself is freed, specifically at lines 66–68.

At line 71, if the file could not be reopened (freopen returns NULL), the wrapper function simply frees up the resource altogether and returns fail (lines 73–76). Otherwise, the function proceeds to line 81 where it will attempt to hold onto the handle for the delayed-free list. In particular, at line 81, the wrapper function tests to determine whether the handle returned by freopen (i.e., at line 57) is the original handle for the file stream. If this condition does not hold true at line 81, then delayed free processing is not attempted. The wrapper function only wants to delay freeing the resource; it does not want to tie up two resources. Therefore, if the wrapper function is not able to place the resource on the delayed free list, it closes the file handle (call to original fclose at line 88) and returns (line 92).

If the same stream is returned by freopen, the wrapper function can place the resource on the delayed free list. This is done, in particular, by calling a delayFreeResource, at line 97. This places the resource on a list of objects which are free and illegal (for present use). Once this is done, the wrapper can return the result, at line 102.

5. Specific approach to memory allocators and destroyers

In an exemplary embodiment, a malloc (memory allocation) wrapper function may be constructed as follows.

```
1:  /*
2:   *     malloc wrapper
3:   */
4:
5:  void __FAR * __export    __cg__malloc(
6:  void __FAR * (*__org__malloc) (size__t __size),
7:  void (*__org__free) (void __FAR *___block),
8:  unsigned int prevEBP,
9:  void * retEIP,
10: size__t __size)
11: {
12:  static FUNCTION func__malloc = { "malloc", __cg__malloc,
13:                                   F__FUNC__ALL, "i=p", 0 };
14:  void __FAR * r;
15:
16:  if (off||inRTLM())
17:  {
18:          __SWITCHTORTLDS;
19:          return __org__malloc(__size);
20:  }
21:
22:  if (deref(__org__malloc)==dll__mailoc)
23:  {
24:          // RTLDLL
25:          __org__malloc = new__dll__malloc;
26:          __org__free   = new__dll__free;
27:  }
28:
29:  enterRTLM();
30:  do
31:  {
32:          __SETRTLDS;
33:          r = __org__malloc(__size);
34:          __RESTOREDS;
35:  } while (r==NULL && freeDelayed(&rsrc__memory));
36:  leaveRTLM();
37:
38:  if (r!=NULL)
39:  {
40:          ITEM __FAR * i;
41:
42:
43:          // if logging regions for access validation, do it
44:
45:          if (!insertRegion(r , __size, 2, 2))
46:          {
47:              __SETRTLDS;
48:              __org__free(r);
49:              __RESTOREDS;
50:              apiFail(&func__malloc,rtlEBP, 0);
51:              return NULL;
52:          }
53:
54:          // if log resources, do it
55:
56:          i = newResource( (unsigned long) r,&rsrc__memory,
57:                  __org__free,&func__malloc,rtlEBP );
58:
59:          if (i==NULL)
60:          {
61:              __SETRTLDS;
62:              __org__free(r);
63:              __RESTOREDS;
64:              deleteRegion(r);
65:              apiFail(&func__malloc,rtlEBP, 0);
66:              return NULL;
67:          }
68:          i->par2 = __size;
69:          i->par1 = (unsigned long) r;
70:          uninitFillBlock(i);
71:
72:          apiRet(&func__malloc,rtlEBP,   (unsigned long) r);
```

```
73:
74:     }
75:     else
76:     {
77:             // if log API errors, do it here
78:
79:             if (__size==0)
80:                     apiRet(&func__malloc,rtlEBP, (unsigned long) r);
81:             else
82:                     apiFail(&func__malloc,rtlEBP, 0);
83:     }
84:     return r;
85: }
```

As shown at line 12, the function declares a "static" descriptor for identifying itself as the "malloc" function. At line 14, a local variable is declared; and it will be employed to store the result (later below). At line 16, the wrapper function performs the previously-described test to determine whether CodeGuard checking is turned off or current execution is already in the runtime library. If either of these conditions holds true, the method, at line 19, calls in to the original malloc runtime library function and then returns. Otherwise, execution continues to line 22. There, DLL (dynamic link library) housekeeping is undertaken, for determining whose malloc function is to be invoked.

At line 29, the wrapper function indicates that it is entering the runtime library memory manager (RTLM). At lines 30–35, the now-familiar "do/while" loop is established. Here, the function attempts an allocation, by calling into the original malloc (line 33). The call will be repeated, however, if the result of the call is unsuccessful and delayed free memory exists. Ultimately, the loop will either obtain a memory block (valid pointer), or fail (pointer set equal to NULL). After completing the loop, the wrapper function resets the flag indicating that it was in the runtime library memory manager, at line 36.

At line 38, the function tests whether a pointer to a valid memory block was obtained (i.e., pointer not equal to NULL). The resource is logged differently than was previously described for a file (handle) resource. Memory has a variable size. As a result, the size of the region must also be tracked. According to the present invention, therefore, the method at this point logs that there is a particular region of memory of a particular size which is legitimate. The recorded length is used, for instance, in the previously-described strcpy function call.

The region is then inserted or logged as a valid region, line 45. If the logging operation fails, the memory block is freed (line 48) and the method returns NULL (line 51). In addition to the just-described logging of a "region" of memory, the function, at line 56, logs the resource as a valid new resource (line 56). If, for some reason, the logging of the resource fails (i.e.,the logical variable, i, is set equal to NULL), the method deletes the region from its list of valid regions (line 46), asserts an API failure (line 65), and returns NULL (line 66).

On the other hand, if the resource is obtained and logged, at line 68 the size of the resource is recorded and at line 69 the pointer (result) to the resource is recorded. This is followed by filling the memory block with garbage information, at line 70. As previously described, this subroutine call includes method steps for pacing unique identifiers during the fail, so that the region can be uniquely identified. After recording the API return value (line 72), the method returns the result, at line 84. In the instance that the resource was not obtained (tested at line 38), the method enters the "else" statement at line 75. Here, the method records a failure and, thereafter, returns.

Complementing malloc is free. In an exemplary embodiment, a free wrapper function may be constructed as follows:

```
 1:  /*
 2:   *    free wrapper
 3:   */
 4:
 5:  void __export    __cg__free(
 6:  void (*__org__free) (void__FAR *__block),
 7:  /* size__t (*__org__msize) (void __FAR * __block), */
 8:  unsigned int prevEBP,
 9:  void * retEIP,
10:  void __FAR *__block)
11:  {
12:  static FUNCTION func__free= {"free",__cg__free,F__FUNC__ALL, "p", 0);
13:  ITEM __FAR * i;
14:
15:  if (off||inRTLM())
16:  {
17:          __SWITCHTORTLDS;
18:          org__free (__block);
19:          return;
20:  }
21:
22:  if (deref(__org__free)==dll__free) __org__free = new__dll__free;
23:
24:  if (__block==NULL) return;
```

-continued

```
25:
26:    // checking parameter errors
27:
28:    if (NULL==( i=isGoodRscParam((unsigned long)_block,
29:                    &rsrc_memory, _org_free, &func_free, rtlEBP) ))
30:    {
31:            // at this point we just want to emit a message
32:            // (via findDelayFreed()) and then quit
33:            findDelayFreed((unsigned long) _block,&rsrc_memory, _org_free);
34:            apiRet(&func_free,rtlEBP, 0);
35:            return;
36:    }
37:
38:    // resource free (delay free)
39:
40:    delayFreeRegion (_block);
41:    delayFreeResource( i, &func_free,rt1EBP, (unsigned long) __block,
42:                            _org_free _PASS_USERDS );
43:    apiRet(&func_free, rtlEBP, 0);
44:    }
```

In a manner similar to that previously described, the function declares a (static) descriptor at line 12, and declares a local variable, at line 13, for storing a result. At line 15, the function performs the previously-described test for determining whether CodeGuard checking is turned off or execution is already within the runtime library memory manager. If either of these conditions hold true, the method calls the original free API function (line 18) and then returns (line 19). At line 22, the function performs DLL housekeeping.

At line 24, if the block (pointer) is equal to NULL, the function simply returns. As defined by the C and C++ programming languages, it is a valid operation to "free" a NULL pointer; see e.g., Ellis M. and Straoustrup B., *The Annotated C++ Reference Manual,* Addison-Wesley, 1990, the disclosure of which is hereby incorporated by reference. The wrapper function can treat this as a special case, for shortcutting further checking. At line 28, the function looks at the actual resource to determine whether it is valid. If it is not legitimate, the function determines whether it is a resource which has already been freed (determined by the call at line 33 to findDelayFreed subroutine). If it is an already freed resource, the subroutine call will immediately signal the error. Thereafter, the function returns, at line 36. Note that, at this point, the requested free operation is not passed on to the original free RTL function, since freeing a resource twice leads to an unstable system.

If the resource is valid, at line 28, the method proceeds to line 40, where it will place the block (i.e., region) on its delayed-free list of regions. In a corresponding manner, the method places the resource on its delayed-free list of resources, at line 41. Thereafter, the function may return.

Compiler Modification

A. General

Certain programming errors can be detected at runtime if direct compiler support is provided. Consider the following example:

```
1:   int i;
2:   char a[10], b[10];
3:   char *p, *q;
4:
5:   a[i + 3] = 0; // valid operation for 0 ≤ i + 3 < 10 only
6:   p = &a + i + 3; // valid operation for 0 ≤ i + 3 < 10 only
```

The above sets forth simple C definitions, including declaration of arrays of characters and pointers to characters. Consider the access in the array α index on [i+3]. Here, i+3 must evaluate such that the boundaries of the array are not violated. Specifically, i+3 must be within the range of 0 to 10 (exclusive of 10). Error checking of this requires compiler support, for specifying the appropriate boundaries of α. In the statement shown at line 6, a similar problem occurs. Here, the statement must evaluate within the range of the array. Note, however, that the pointer, p, can be equal to 10 since, in the C programming language, a pointer can point to the next element after an array. Although it is not permissible to access this element (because it does not exist), it is permissible to have a pointer pointing to it.

Consider a third type of problem choosing the above-described data members.

$i=p-q;$ // valid operation if p and q point into the same block

This represents the third type of problem—addition and/or subtracction of pointers—which requires checking. Given the expression p-q, p and q must point into the same block of memory.

Figure 3A:
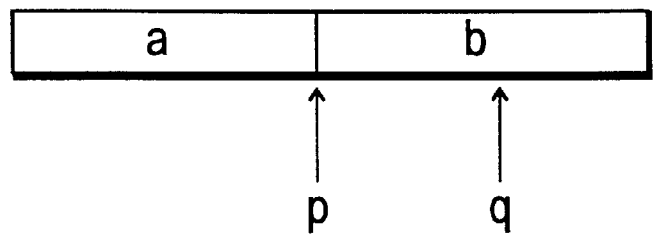
FIG. 3A is a diagram illustrating memory allocated for two arrays.

Consider the following problem which arises in C, as shown in FIG. 3A. Suppose two arrays, a an b, are allocated, with a being allocated just in front of b. Consider the following operation:

$p=\&a+10;$

This operation is legal, because it points to the next element after a (which, recall, is legal in C).

Consider further that q is initialized in the middle of b as follows:

$q=\&b+5;$

Taking the pointer difference of p-q is legal since p points to the first element of b and q points to the middle of b. Note, however, that p is obtained by adding something to a which is not legal.

Figure 3B:
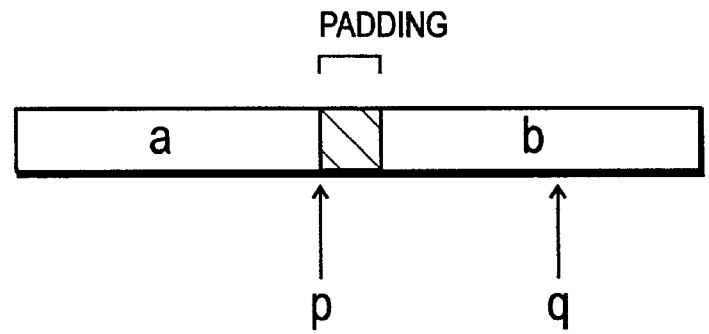
FIG. 3B is a block diagram illustrating "padding" bytes which are employed between variables, by the compiler in the system of the present invention.

In order to detect such a mistake, the compiler in the system of the present invention inserts "padding" bytes between variables. This is illustrated diagramatically in FIG. 3B. Since this padding exists between data members at time of compile, the support is at the level of the compiler. In an exemplary embodiment, the padding is at least one byte (or machine addressable unit). Preferably, padding is added between each and every local variable, since each is treated as a separate memory block which is independent of others. Note, however, that parameters (i.e., arguments passed to functions) cannot be padded, without changing the calling convention (e.g., pascal, cdecl, and the like). In a preferred embodiment, therefore, all local and global variables are padded, except for arguments passed to functions.

In order to validate an operation, the CodeGuard Library needs the following information:

(1) Kind of operation: that is, memory access, pointer arithmetic, and the like;

(2) The operands of the operation: memory address and access size (i.e., size of the particular data members); and (3) Location and size of allocated memory blocks.

Each will be described in further detail.

B. Location and size of allocated memory blocks

Compiler support is not required for blocks allocated by malloc, the C runtime library routine for dynamic allocation. As previously described, CodeGuard already knows about the blocks that have been allocated by malloc, as it tracks them as they are allocated. On the other hand, the CodeGuard Library does not known about local and global variables for each module. Accordingly, compiler support is provided in the form of descriptors for indicating the local and global variables. As previously described, for each module, the compiler builds one descriptor for all global variables (i.e., static data) of the module. The address of the global descriptor is passed to the CodeGuard library during execution of startup code of the module.

The compiler also builds one descriptor for all local variables of each function. The actual descriptor for the local variables is stored after the code of each function. The address of the local descriptor is stored at a fixed offset in the stack frame of each guarded function. In a preferred embodiment, a special ID or "magic number" is stored at a fixed offset in the stack frame (EDP-4), for identifying a function as a "code guarded" function. Upon encountering this at runtime, the system may then read the accompanying address of the descriptor in the stack frame for accessing the descriptor. After referencing these descriptors, the CodeGuard library knows where all allocated memory blocks (including simple variables) reside, as well as blocks allocated by malloc.

C. Type of operation and operands of operation

Consider again the following statement:

a[i+3]=0;

This operation will be performed by one instruction:

mov byte ptr [EBP+EAX–17], 0

This instruction can be decomposed into several offsets as follows. The a variable resides on the stack; the i variable resides in the EAX register (Intel). The addition of +3 corresponds to stack offset of –17—that is, the offset of a (–20+3).

To check this at runtime, the following must be communicated to the CodeGuard Library; the starting address of the array, the offset within it, and how much of it is accessed. The operations which must be checked, therefore, include pointer arithmetic and access of data at the pointed-to address. The generated code is as follows:

```
push 1           ; element size
push -20         ; offset of a
push EAX         ; index of array
push 0           ; no index scaling (i.e., 2°)
push 3           ; offset
call __CG__LDA__EOXSY
```

As shown, the system first pushes the size of the element— one byte of the array. This is followed by a push of the offset of a, at the second line. The index of the array (i) is then pushed, followed by the index scaling, here 0 (i.e., 1 which is 2 raised to the power of 0). Finally, before the call, the offset (3) is pushed.

Figure 4:
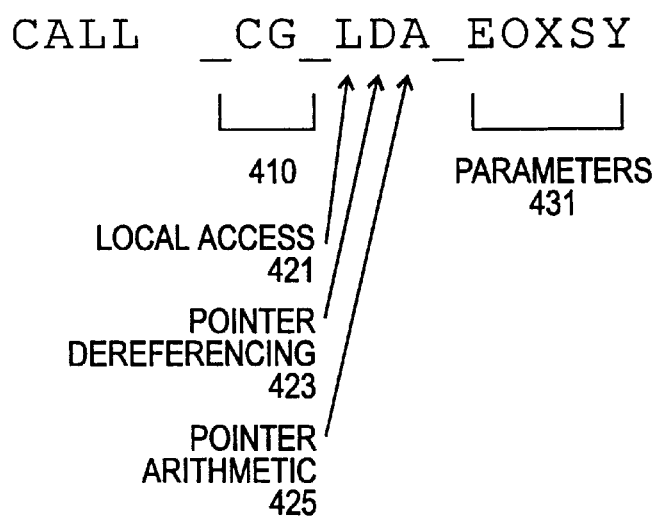
FIG. 4 is a diagram indicating use of a mnemonic as a procedure check.

The procedure is called using a mnemonic which indicates the procedure check. As indicated in FIG. 4, the mnemonic starts with an identifying sequence 410 of __CG__. This is followed by character 421, L, which indicates local access. Since the access is local, EBP is implied (and, therefore, need not be pushed onto the stack). Character 423, D, indicates that the checked operation includes a pointer dereferencing and, thus, includes a memory access operation. Character 425, A, indicates that the call includes pointer arithmetic. Finally, the mnemonic includes a parameters list 431. A whole list of such functions is possible, depending on which operations are being performed. Appended herewith as Appendix A are source listing demonstrating possible checks in an exemplary embodiment.

The compiler inserts the relevant call in front of instructions which access memory or perform pointer arithmetic. The CodeGuard Library, in turn, employs its database of valid memory blocks to check whether the pointer arithmetic and access are valid. Specifically, the CodeGuard Library can check whether the access is completely within the two same blocks (i.e., no block overrun) and check whether pointer arithmetic does not span over two blocks. The calls are inserted by the code generator of the compiler before each operation to be checked. The additional code is inserted during the regular code generation phase of compilation and, thus, requires no additional compilation phase.

D. Compiler operation

The operation of compilation by a compiler comprises two main components: a front end and a back end. The "front end" of the compiler parses the source program and builds a parse tree—a well known tree data structure representing parsed source code. The "back end" traverses the tree and generates code (if necessary) for each node of the tree, in a post-order fashion. For an introduction to the general construction and operation of compilers, see Fischer et al., *Crafting a Compiler with C*, Benjamin/Cummings Publishing Company, Inc., 1991, the disclosure of which is hereby incorporated by reference.

In a preferred embodiment, CodeGuard compiler support is provided, without requiring an additional compilation phase. Instead, the additional CodeGuard calls added by the compiler are generated at the same time as the regular calls (i.e., the calls which result from the user's source code). Consider, again, the statement:

a[i+3]=0;

Above, the variable a is indexed by i+3. In the system, code generation is delayed when walking or traversing the parse tree, until the addressing modes of the processor can be fully exploited.

Figure 5:
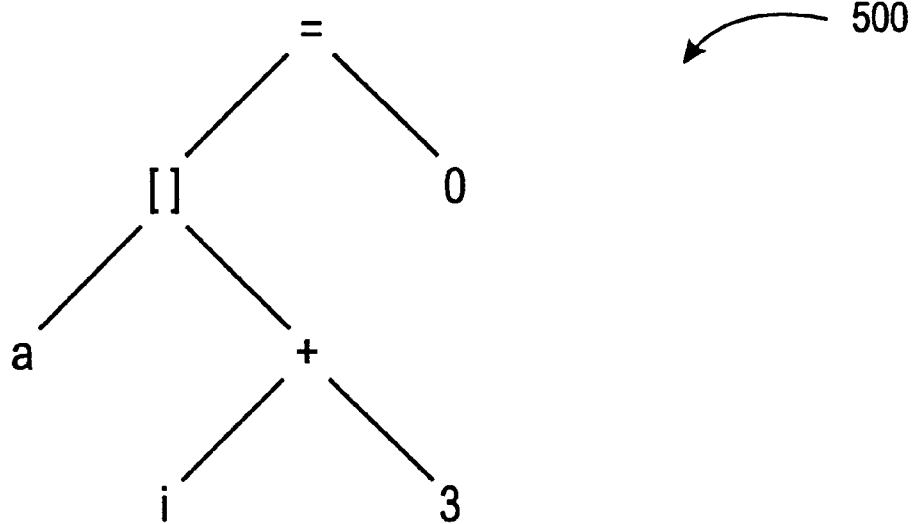
FIG. 5 illustrates a parse tree for an assignment statement.

A parse tree for the above statement is shown as tree 500, in FIG. 5. The code generator will not necessarily generate code for each node, however. For instance, the compiler would not emit code which would load i in a register, load 3 in a register, and then emit a register instruction for adding the two registers. Instead, the entire expression can be executed in a single instruction, using a different addressing mode of the processor. In the example above, therefore, only one instruction is emitted for the top node, coding the entire tree 500. In a preferred embodiment, the CodeGuard all is emitted just before the instruction(s) performing the operating which requires access to memory. Thus for the example above, this would be just before the assignment—at the top of the tree.

Further, the compiler builds a CodeGuard call when operands are created, not when used. For the example above, for instance, there are many possible uses of the operands. To compile a check for each possible use of an operand would be inefficient (and highly impractical). A check would have to be inserted, for the above example, in all possible uses of a (i+3). Therefore, the call is generated in the system of the present invention when the above is built, not when it is used.

The actual nodes which can build an operand in memory are relatively few. In an exemplary embodiment, they comprise the following:

index node: []

field node: .

dereference node: *()

address node: & pointer addition node: + pointer subtraction node: −

As shown, nodes exist to index a variable (as shown in the above array example), dereference a field of a variable (e.g., using [struct][field]syntax), derference a pointer (e.g., *p=0), take the address of an operand (e.g., p=&a), and perform pointer arithmetic (both addition and subtraction).

Figure 6:
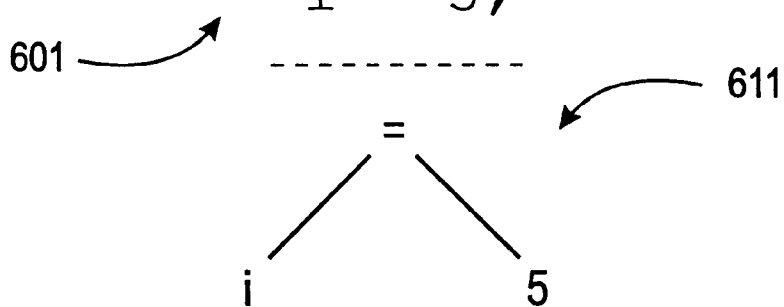
FIG. 6 illustrates a parse tree for an assignment to a variable (which is then used without change).

Although a simple variable can be used as an operand, it is not really of interest. Specifically, the variable is used without change (e.g., i.=5). Note that, here a simple variable does not required checking, since there is nothing to "go wrong." Instead, calls to CodeGuard are reserved for operations which can go wrong. This is illustrated diagramatically in FIG. 6. As shown, the assignment of i=5 (shown at 601) corresponds to the parse tree of 611. Memory space is allocated by the compiler for i; the address is not manipulated by the programmer. Accordingly, modification is made in the compiler for processing of those particular nodes which involve memory access (i.e., operations which can "go wrong").

Care must be taken regarding the context of a particular operation. Consider the following statement:

$p[i].x=0;$

Figure 7A:
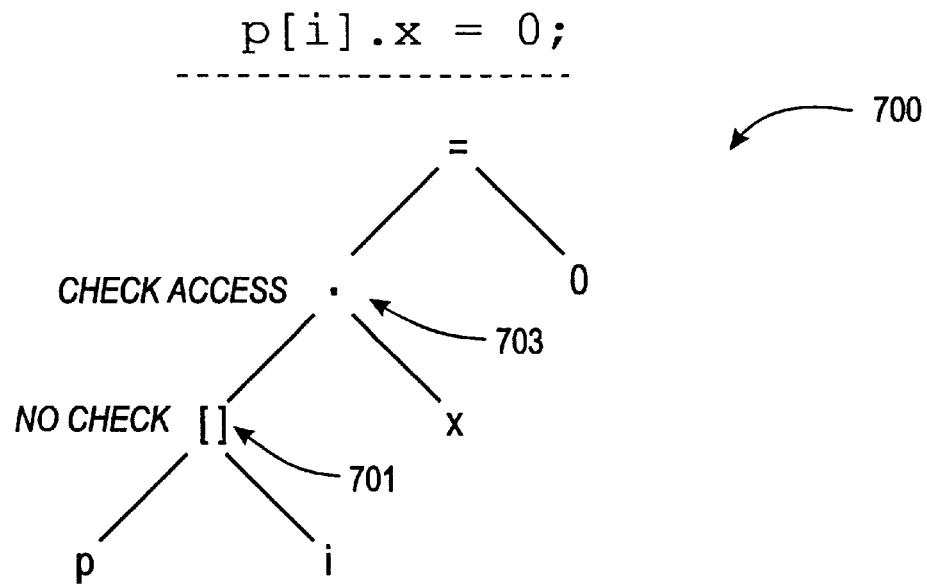
FIG. 7A is a diagram of a parse tree for a statement which indexes through an array.
Figure 7B:
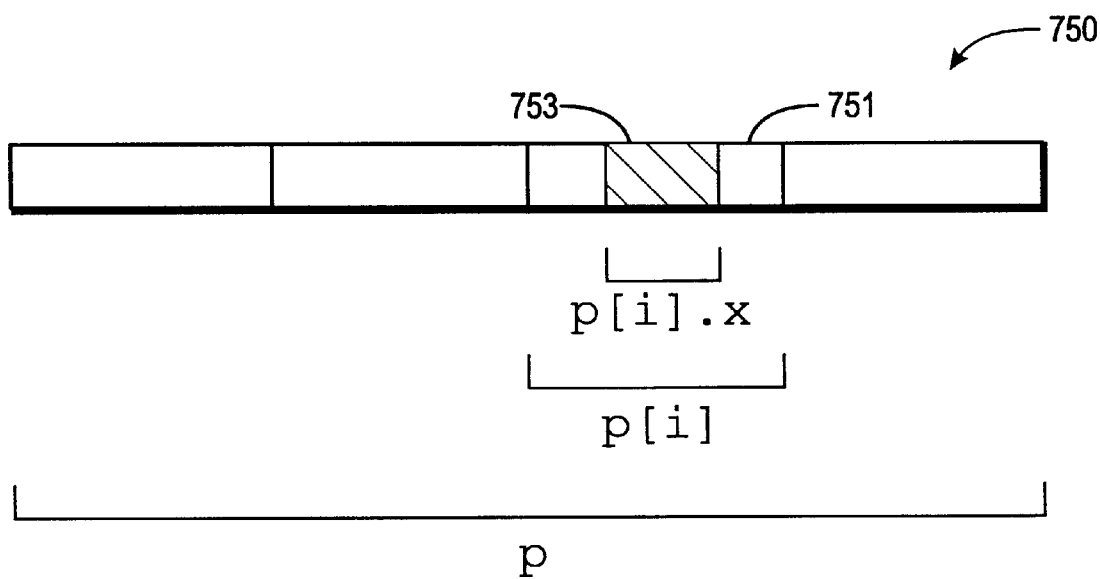
FIG. 7B is a block diagram which illustrates that checking for a node (of a parse tree) is deferred until a particular address of interest (i.e., field member within a structure) is resolved.

A parse subtree 700 for the above statement is shown in FIG. 7A. A check should not be made at the index node (i.e., node 701), since the whole structure is not being accessed; instead, only the field x of the structure is being accessed. Accordingly, checking is deferred until node 703 is reached. In other words, checking is deferred until the particular address of interest (i.e., field member within a structure) is resolved. FIG. 7B illustrates this diagramatically. Consider an array of p (i.e., memory block 750). The range associated with a particular element of array p—that is, p [i]—is shown by memory block 751. Note, however, that this memory block is not accessed. Instead, the small range associated with field x is accessed, as shown by memory block 753. Stated generally, therefore, checking is deferred until the system resolves a particular memory address which is knows will actually be accessed.

Consider, in contrast, the following statement:

$p[i]=p[j];$

Figure 8:
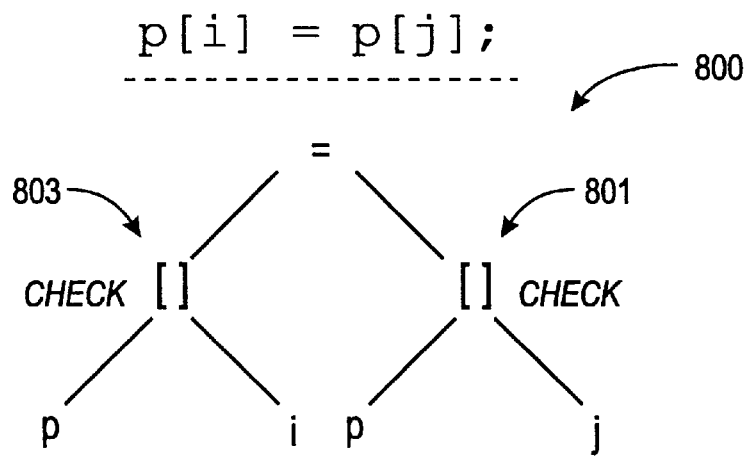
FIG. 8 is a diagram of a parse tree for a statement which illustrates checking access for the assignment between two elements of an array.

A parse subtree for the above statement is shown as subtree 800, in FIG. 8. Here, the whole structure (i.e., p[i]) is actually accessed (not just a particular member). In this case, two checks are required. Specifically, a check is made at node 801, when the structure p[j] is read. Additionally, a check is made at node 803, when the structure p[i] is written. All told the decision whether to check a particular node depends on what is "on top" of the node—that is, its particular context (relative to other nodes). As the back end of the compiler is processing nodes of the parse tree, whether it inserts a CodeGuard check in the executable binary image being generated depends on the above-described analysis of context.

In addition to the above-illustrated checking of access to a particular region of memory, the system of the present invention also, when appropriate, checks a particular address (without access to that address). Consider the following statement:

$i=\&p[i].x;$

Figure 9:
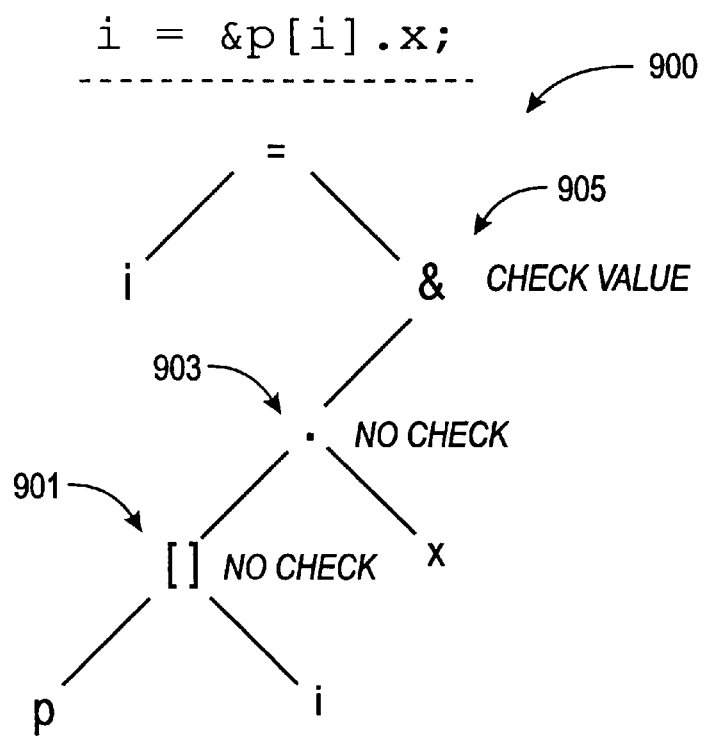
FIG. 9 is a diagram of a parse tree for a statement which illustrates that the system will, at times, check for an "access" to an address, and at other times check for the address itself (i.e., without access).

Here, instead of accessing p[i].x, the statement takes the "address" of p[i]x. The parse subtree for the statement is shown as parse subtree 900, in FIG. 9. As shown, the compiler does not insert a check for p[i].x itself; in other words, node 901 and node 903 are not checked. The check is, instead, deferred until node 905, which corresponds to the particular node where a check of the address of p[i].x can be appropriately inserted. According to the present invention, therefore, sometimes a check is made for the "access" to an address, and other times a check is made for the address itself (i.e., without access). In this manner, the system can appropriately handle situations in which the "address" itself is valid but access to that address is invalid. In the instance of the statement shown in FIG. 9, presence of line & node inhibits the "access" check in the field node, thus leading the compiler to insert a "value" check.

The particular modification to the compiler for performing the above-described checks is as follows. In general operation, the compiler first traverses or walks down a parse tree and, then, generates program code when coming back up the tree. When walking down the tree, the compiler marks those nodes that do not need to be checked. Referring back to FIG. 9, for instance, when the compiler walks from the address node 905 (where a check is performed) to node 903 and node 901, it marks each of these children nodes (i.e., node 903 and node 901) as "no check." In a corresponding manner, a field node (e.g., node 703, shown in FIG. 7A) will indicate to its children nodes that they should not check, since the field node itself is performing the check. According to the present invention, therefore, each node of the parse tree includes a flag indicating whether a CodeGuard check should be preformed. When the flag for a node is set to indicate that a check should be performed, "no check" is propagated to subsequent "children" nodes. When traversing back up the tree, after code has been generated for a particular node, the compiler inserts a CodeGuard check for the node if the corresponding flag has been set for checking (specifically, the check-inhibiting flag is absent).

Figure 10:
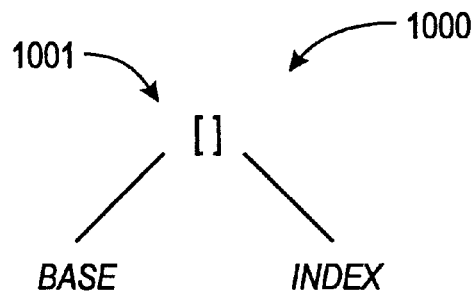
FIG. 10 is a diagram of a parse tree which illustrates the general processing of an index node.

Referring now to FIG. 10, the general processing of an index node, n will be illustrated. FIG. 10 illustrates a parse subtree 1000, including an index node 1001. When proceeding down the tree, the compiler performs the following:

```
down: mark n → base for no access check
      process      n → base
      process      n → index
      generate code for n depending on the
               addressing modes returned by the processing
               of n → base and n → index.
```

When proceeding back up the tree, the compiler performs the following:

up: if n is not marked, generate call

CodeGuard, checking the access to n.

Figure 11:
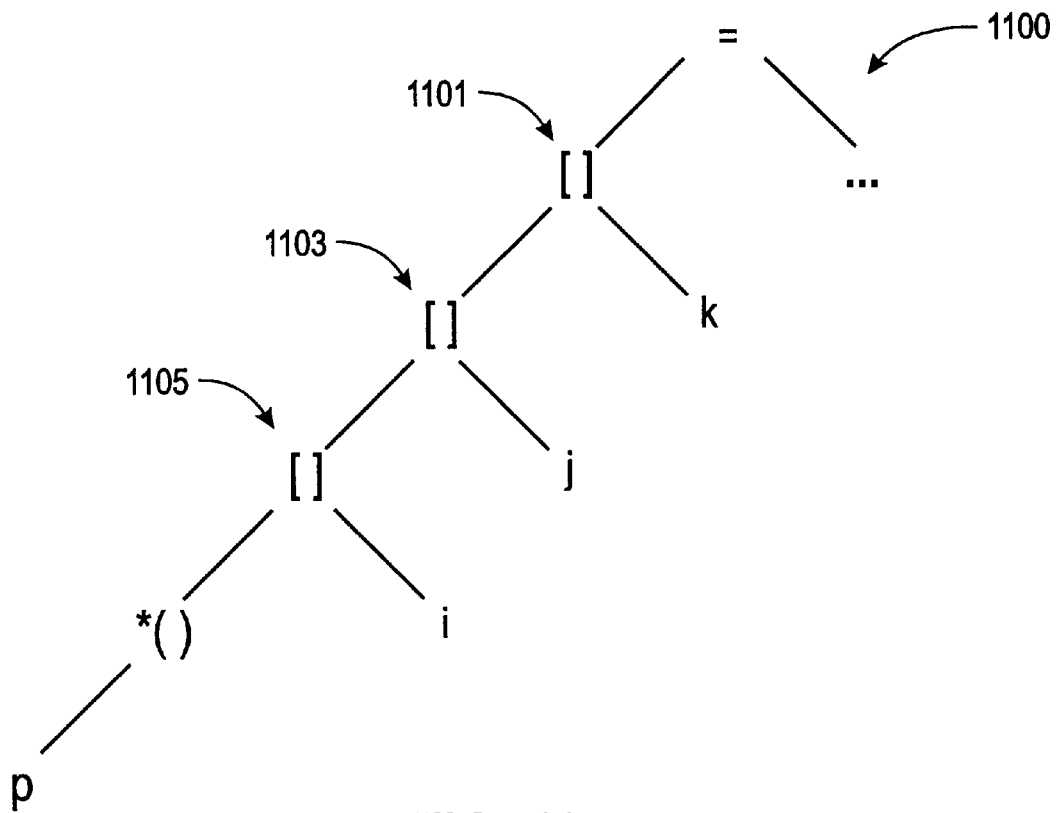
FIG. 11 is a diagram of a parse tree which illustrates treatment for a pointer which points to an array.

A particular problem must be addressed, however. Consider the following case:

(*p) [i, j, k]=. . . ;

The parse subtree for the statement is shown as parse subtree 1100, in FIG. 11. This is an example of a pointer pointing to an array; the pointer is de-referenced to the array which is then indexed with particular indexes, here, i, j and k. According to the above-described approach, the check will be performed at the top index node (i.e., node 1101), which will, therefore, inhibit checking in lower nodes (i.e., node 1103 and node 1105). It suffices to perform only one check in the case that the base address, p, is known. For the example of FIG. 11, first the array is pointed to (i.e., the base address of the array), then indexes are added (i,j,k) to generate the end address (corresponding to node 1101). The system must, however, be sure that it did not overrun several blocks of memory, so it is necessary to know at which point it started. If a simple variable exists at the beginning, the system always knows the address (at a given instance). If, on the other hand, the address is volatile (e.g., adding indexes i, j, and k to the particular register containing the pointer), the starting base or address is destroyed—the starting base is not preserved.

In the case of a volatile address, the system of the present invention propagates down information indicating that the starting address is required to perform the check. In response to this information, the starting address is preserved or saved. In other words, when the compiler walks down the tree, it communicates to lower nodes that the base address of an operand will be needed for checking. This information is propagated all the way down to the base. There, if the base is a (simple) variable, its address cannot be modified; thus, it is not necessary to really save the address. If, on the other hand, the base is a de-referenced pointer (e.g., as illustrated in FIG. 11), the pointer value should be preserved, such as saving it on the stack. Also at compile time, the system saves information indicating where on the stack this value can be found when the system arrives at the top index node at runtime.

In any case, the location of the base address, saved or not, is pushed onto a compile-time stack, and the node is marked as "saved." The saved information is then propagated up the tree until it is used by a call to the CodeGuard Library. There, the location of the base address is popped from the compile-time stack. If the retrieved information indicates that the base address was saved on the run-time stack, code is generated to pop the base address from the stack before passing it to the CodeGuard Library. Therefore, either the base address is saved (and available from the stack), or, in the case of a simple variable, the offset is saved in a compile-time stack.

D. Compiler implementation

In an exemplary embodiment, the following flags are employed for walking the nodes:

1. CG_NOVALCK
2. CG_NOACCCK
3. CG_SAVEVAL
4. CG_SAVEADR
5. CG_SAVED
6. CG_SAVEBVAL
7. CG_SAVEBADR

The first flag indicates "no value check." The second flag indicates "no access check." The third flag indicates "save value" of the base. The fourth flag indicates "save address" of the base. The fifth flag indicates that these have been "saved."

The sixth flag indicates "save base value." The seventh flag indicates "save base address." The sixth and seventh flag are required to address the problem that leaf nodes of the tree are preferably not marked. The leaf nodes of the tree are elements of the symbol table. These elements of the symbol table are, in turn, used by multiple trees. If the above flags were stored in the symbol table, it is possible that processing of another tree might modify the flag inappropriately. In accordance with the present invention, therefore, when a symbol must be marked, the system actually marks the node on top of the symbol, indicating that it is for the base. Thus, the sixth and seventh flag are provided for indicating that the base value and base address should be saved, respectively.

Figure 12A:
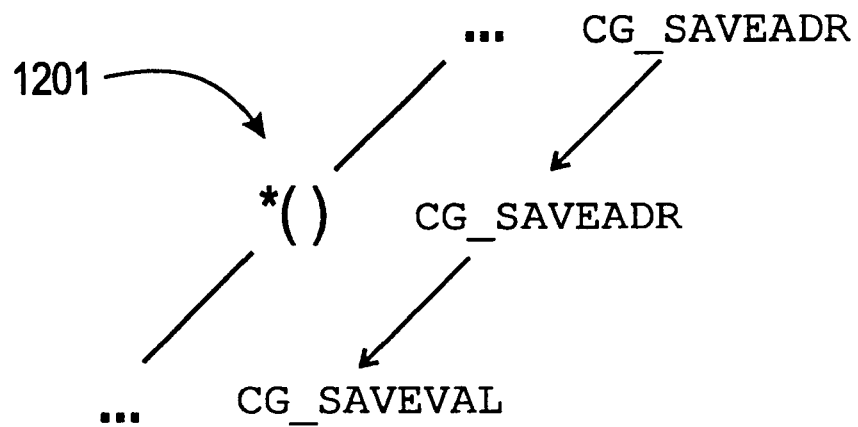
FIGS. 12A–B are diagrams illustrating use of flags when processing parse trees.
Figure 12B:
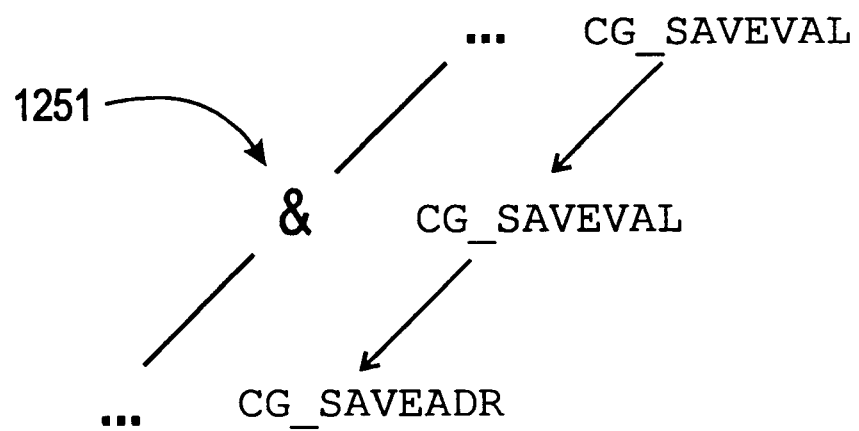

Two save flags are provided because the "address" or the "value" can be saved. Consider a statement which includes de-referencing a pointer. In the corresponding parse subtree, the de-reference node transforms the "save address" flag into the "save value " flag, while propagating it downward. This is illustrated in FIG. 12A. Below the de-reference node 1201, it is the value of the pointer which is saved. The complementary case is illustrated in FIG. 12B. Here, the address node 1251 does the opposite; transforms a "save value" flag into a "save address" flag when propagating it downward.

Actual modification to the compiler includes extending existing node processing functions by adding calls to CGDown and CGUp functions which perform the actual marking, base saving, and generation of calls into the CodeGuard library. In an exemplary embodiment, the CGDown function may be constructed as follows (using the C programming language).

```
static      void  CGDown(Node *n, Node *base, CGFlags f)
/*    - propagate CG_SAVExxx flags down
      - add f to base->fld.cgflags if base is a node
      - convert and add f to n->fld.cgflags if base is a symbol
*/
{
      CGFlags   g;
      if        (base->g.kind == NK_CSE)
                base = base->op.right;
      g = n->fld.cgflags & (CG_SAVEADR|CG_SAVEVAL);
      if        (n->g.kind == NK_ADR)
      {
                if    (g & CG_SAVEVAL)
                      g = CG_SAVEADR;
      }
      else
      {
```

```
                g &= ~CG_SAVEVAL; /* is propagated down through f if needed */
                if      (n->g.kind == NK_INDIR)
                {
                        if      (g & CG_SAVEADR)
                                g = CG_SAVEVAL;
                }
        }
        f |= g;
        if      (base->g.kind < NK_NULL)
        {
                if      (f & CG_SAVEADR)
                        n->fld.cgflags |= CG SAVEBADR;
                else if         (f & CG_SAVEVAL)
                {
                        if      (base->g.flags & SF_REG)
                        {
                                if      (base->g.kind == SY_ABSVAR)
                                /*      should actually not occur: always a NK_FIELD
                                        on top of pseudoreg (pointer cast),
                                        so CG_SAVEVAL is masked out */
                                        base->g.c.mr = base->sym.val.intVal;
                                CGSaveVal(base); /* save it before it's too late */
                                n->fld.cgflags |= CG_SAVED;
                        }
                        else
                                n->fld.cgflags |= CG SAVEBVAL;
                }
        }
        else
        {
                base->fld.cgflags |= f;
                assert((base->fld.cgflags & (CG_SAVEADR|CG_SAVEVAL))
                        != (CG_SAVEADR|CG_SAVEVAL), "C");
        }
}
```

In an exemplary embodiment, the CGUp function maybe constructed as follows:

```
static          void    CGUp(Node *n, Node *base, CGFlags f)
/*      - save base symbol if marked
        - propagate CG_SAVED flag up if base is a node
        - check if needed, and save n if needed */
{
        if      (base->g.kind == NK_CSE)
                base = base->op.right;
        if      (base->g.kind < NK_NULL)
        {
                if      (n->fld.cgflags & CG_SAVEBADR)
                {
                        CGSav_Adr(base);
                        n->fld.cgflags |= CG_SAVED;
                }
                else if         (n->fld.cgflags & CG_SAVEBVAL)
                {
                        CGSaveVal(base);
                        n->fld.cgflags |= CG_SAVED;
                }
        }
        else
                n->fld.cgflags |= base->fld.cgflags & CG_SAVED;
        if      (f & CG->CHECKACC)
        {
                if (n->fld.cgflags & CG_NOACCCK)
                {
                        if      (n->fld.cgflags & CG_NOUPCALL)
                                CGCheckAdr(n);
                }
                else
                        CGCheckAcc(n);
        }
        if      ((f & CG_CHECKVAL) && !(n->fld.cgflags & CG_NOVALCK))
                CGCheckVal(n);
        if      ((n->fld.cgflags & (CG_SAVEADR|CG_SAVEVAL))
                && ! (n->fld.cgflags & CG_SAVED))
```

-continued

```
{
    if    (n->fld.cgflags & CG_SAVEADR)
          CGSavAdr(n);
    else
          CGSaveVal(n);
    n->fld.cgflags |= CGSAVED;
}
}
```

Figure 13:
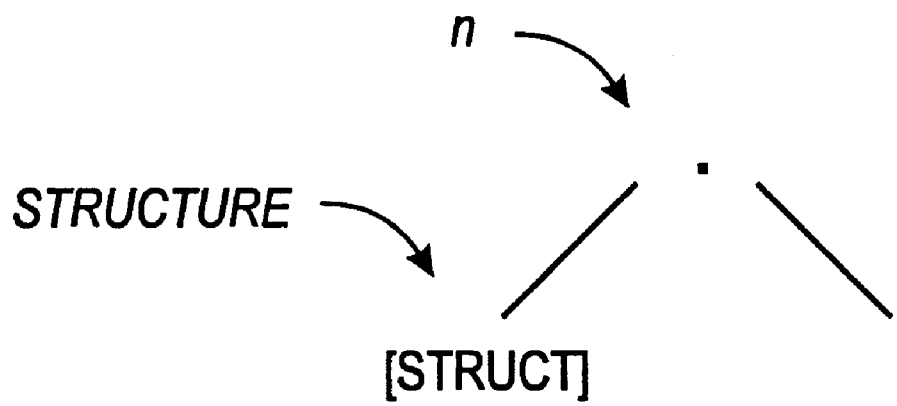
FIG. 13 is a diagram of a parse tree, illustrating processing of a field node, by a method of the present invention.

These functions are invoked as follows. For a field node, the CGDown function is invoked as follows:

CGDown (n, structure, CG_NOACCCK);

As shown in FIG. 13, the first parameter, n, corresponds to the top level node. The second parameter, structure, corresponds to the structure or record for that field. The third parameter is set to "no access," for indicating that an access check is not required.

When coming back up, the field node is processed by CGUp, as follows:

CGUp(n, structure, CG_CHECKACC);

When coming back up the tree, access is checked. As the process is recursive, the node can be marked as no check.

For a de-reference node, the CGDown function is invoked as follows.

Figure 14:
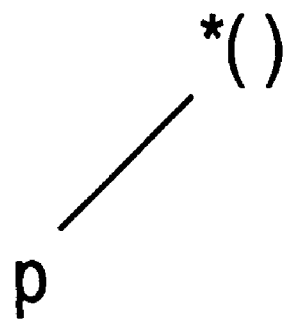
FIG. 14 is a diagram of a parse tree, illustrating processing of a de-reference node, by a method of the present invention.

CGDown (n, pointer, 0);

As shown, when going down, the system does not request "no check," because when a pointer is de-referenced (as indicated in FIG. 14), if it is an expression or variable, it will be accessed to de-reference it. For the de-reference node, the call to CGUp is as follows:

CGUp (n, pointer, CG_CHECKACC);

As shown, an access check is required.

The CGDown function is invoked as follows:

CGDown (n, array, CG_NOACCCK|(array→g.kind==NK_IN-DEX?CG_SAVEADR: 0));

For the index node, n and the array are passed. Additionally, "no access check" is required. As also shown, however, the address is also saved for instances where multiple indexes exist for the array (e.g., as illustrated in FIG. 11). In such a case, the address is also saved for use later, as previously described.

When coming back up the index node, the CGUp function is invoked as follows:

CGUp (n, array, CG_CHECKACC);

As shown, access is checked on the return trip.

For an address node, the CGDown function is invoked as follows:

CGDOWN (n, expression, CG_NOACCOK);

As shown, when going own, "no access check" is specified.

When coming back up, the CGUp function is involved as follows:

CDGUp (n, expression, CG_CHECKVAL);

When coming back up, as shown, the "value" (not the "address") is checked.

For pointer addition or subtraction, the CGDown function is invoked as follows:

CGDown (n, pointer, CG_NOVALCK|C CG_SAVEVAL);

As shown, when going down the flag is set specifying "no value check" (as something will be added to it); the value is, instead, saved.

When traversing back up, the CGUp function is invoked as follows:

CGUp (n, pointer, CG_CHECKVAL);

As shown, when coming back, the value is checked. If, for example, a chain of additions occur, the following will happen. For each node encountered, on the downward traversal, "no value check" is specified but the "save value" will be propagated. On the return trip up, nothing will be checked until the result node. At that point, the system will compare the starting address (that was saved) with the end result, for making sure that both are within the same block.

Additional reference material illustrating a preferred user interface and general operation of the present invention is available from *Borland Code Guard™; User's Guide* (Part No. LCG1110WWW21770, Borland International, Inc. of Scotts Valley, Calif.), which is appended herewith as Appendix C.

While the invention is described in some detail with specific reference to a single preferred embodiment and certain alternatives, there is no intent to limit the invention to that particular embodiment or those specific alternatives. Thus, the true scope of the present invention is not limited to any one of the foregoing exemplary embodiments but is instead defined by the appended claims.

APPENDIX A

```
void __pascal   _cg_gda_egxsy(long e, char *g, long x, long s, long y)
/* global deref and arith, e bytes at g + ((x<<s)+y) */
{
} void __pascal   _cg_ga_gxsy(char *g, long x, long s, long y)
/* global arith, g + ((x<<s)+y) */
{
} void __pascal   _cg_gda_egy(long e, char *g, long y)
/* global deref and arith, e bytes at g + y */
{
} void __pascal   _cg_ga_gy(char *g, long y)
/* global arith, g + y */
{
} void __pascal   _cg_lda_eoxsy(long e, long o, long x, long s, long y)
/* local deref and arith, e bytes at (ebp+o) + ((x<<s)+y) */
{
} void __pascal   _cg_la_oxsy(long o, long x, long s, long y)
/* local arith, (ebp+o) + ((x<<s)+y) */
{
} void __pascal   _cg_lda_epoxsy(long e, char *p, long o, long x, long s, long y)
/* local deref and arith, e bytes at (p+o) + ((x<<s)+y) */
{
} void __pascal   _cg_la_poxsy(char *p, long o, long x, long s, long y)
/* local arith, (p+o) + ((x<<s)+y) */
{
} void __pascal   _cg_lda_eoy(long e, long o, long y)
/* local deref and arith, e bytes at (ebp+o) + y */
{
} void __pascal   _cg_la_oy(long o, long y)
/* local arith, (ebp+o) + y */
{
} void __pascal   _cg_lda_epoy(long e, char *p, long o, long y)
/* local deref and arith, e bytes at (p+o) + y */
{
}
```

55

```
void __pascal   _cg_la_poy(char *p, long o, long y)
/* local arith, (p+o) + y */
{
} void __pascal   _cg_da_epxsy(long e, char *p, long x, long s, long y)
/* deref and arith, e bytes at p + ((x<<s)+y) */
{
} void __pascal   _cg_a_pxsy(char *p, long x, long s, long y)
/* arith, p + ((x<<s)+y) */
{
} void __pascal   _cg_da_epy(long e, char *p, long y)
/* deref and arith, e bytes at p + y */
{
} void __pascal   _cg_d_ep(long e, char *p)
/* deref, e bytes at p */
{
} void __pascal   _cg_da_bep(char *b, long e, char *p)
/* deref and arith, e bytes at b + (p-b) */
{
} void __pascal   _cg_lda_bep(char *b, long e, char *p)
/* local deref and arith, e bytes at b + (p-b) */
{
} void __pascal   _cg_da_bepxsy(char *b, long e, char *p, long x, long s,
long y)
/* deref and arith, e bytes at b + (p-b+(x<<s)+y) */
{
} void __pascal   _cg_a_bpxsy(char *b, char *p, long x, long s, long y)
/* arith, b + (p-b+(x<<s)+y) */
{
} void __pascal   _cg_lda_bepxsy(char *b, long e, char *p, long x, long s,
long y)
/* local deref and arith, e bytes at b + (p-b+(x<<s)+y) */
{
} void __pascal   _cg_la_bpxsy(char *b, char *p, long x, long s, long y)
/* local arith, b + (p-b+(x<<s)+y) */
{
} void __pascal   _cg_a_py(char *p, long y)
```

56

```
        /* arith, p + y */
        {
        }

5       void __pascal    _cg_a_p(char *p)
        /* arith, p */
        {
        }

10      void __pascal    _cg_a_pd(char *p, long d)
        /* arith, p - d */
        {
        }

15      void __pascal    _cg_a_pq(char *p, char *q)
        /* arith, p - q */
        {
        }

20      void __pascal    _cg_ga_bp(char *b, char *p)
        /* global arith, b + (p-b) */
        {
        }

25      void __pascal    _cg_la_bp(char *b, char *p)
        /* local arith, b + (p-b) */
        {
        }

30      void __pascal    _cg_a_bp(char *b, char *p)
        /* arith, b + (p-b) */
        {
        }

35      void __pascal    _cg_this(long e, char *t)
        /* e bytes at t, t is "this" in method */
        {
        }

40      void __pascal    _cg_dtorthis(long e, char *t)
        /* e bytes at t, t is "this" in destructor */
        {
        }

45      void __pascal    _cg_intr_strcpy(char *d, char *s)
        /* copy string s to d */
        {
        }

50      void __pascal    _cg_desc(unsigned long *d)
        /* pointer to the global descriptor */
        {
        }

55
```

APPENDIX B

```
/*
 * Validate function
 * _cg_validate
 * Copyright © 1995, Borland Internatinal, Inc.
 *
 */ unsigned long __pascal __export _cg_validate(void * ptr, long offset,
unsigned long size, Vflag_t flags, FUNCTION _FAR * f, unsigned int
wrapperEBP)
{
  unsigned long start, end;
  EVENT   accessEvent;
  unsigned long stack_top;
  unsigned long stack_bot;
  unsigned long lptr = ADDRTOLONG(ptr);

if (off) return 0;

if ( f!=NULL )
    {
    if ( f->nextFunc==NULL)
       registerFunction(f);
    if ( !(f->options & F_FUNC_ACCESS))
       return 0;
    }

// calculate range that this access/ arithmetic covers start = lptr;
  if (ADDRTOLONG(ptr)+offset < start) start = ADDRTOLONG(ptr)+offset;

end = ADDRTOLONG(ptr) + offset + size;
  if (ADDRTOLONG(ptr) > end)
     end  = ADDRTOLONG(ptr);

// first check if it is on the stack???

#ifdef __WIN32__
    asm{
       mov   eax, fs:[4];
       mov   stack_top, eax;
       mov   eax, fs:[8];
       mov   stack_bot, eax;
    }
  #else
     stack_top = ADDRTOLONG(*((char _ss * _ss *) 0x0E));
     stack_bot = ADDRTOLONG(*((char _ss * _ss *) 0x0A));
  #endif if (lptr < stack_top && lptr  >= stack_bot)
     {

// ----------------------------------------
     // A./  is it wrong side of the stack???
     // ----------------------------------------
```

58

```
            if ((unsigned int)lptr <= wrapperEBP)
            {
               accessEvent.f              = f;
               accessEvent.type.access.ptr    = ptr;
               accessEvent.type.access.offset= offset;
               accessEvent.type.access.size   = size;
               accessEvent.code = ERR_PTR_STACK_UNINIT;
               accessEvent.info = INFO_NONE;
               accessEvent.code |= getPtrFlags(flags);
               logEvent(&accessEvent, wrapperEBP);
               return 0;
            }

// ----------------------------------------
            // B./ the correct side of the stack???
            // ---------------------------------------- else
            {
               STACKFRAME _ss * oldebp = (STACKFRAME _ss *) anded(wrapperEBP);
               STACKFRAME _ss * ebp
                   = (STACKFRAME _ss *) anded(((STACKFRAME _ss *) oldebp) ->ebp);
#ifndef __WIN32__
               int       isNearFrame;
               unsigned short   lastCS;

lastCS = 0;

if (((STACKFRAME _ss *) oldebp)->ebp & 1)
                  isNearFrame = 0;
               else
                  isNearFrame = 1;
#endif
               // __try/except is very expensive. It will generate an
               // InitExceptionBlock call at the _cg_validate prolog.
               // The following while loop makes it GP-safe by cautiously
               // testing the range as it follows the bp chain.
               //__try
               //{

//
               // All the comparisons from now on can be done as unsigned ints.
               // this will cause the 16-bit version to only compare offsets,
               // which is sufficient and is more efficient. In 32-bit it has
               // no effect.
               //
               while ((unsigned int) ebp > (unsigned int) oldebp &&
                      (unsigned int) ebp < (unsigned int) stack_top &&
                      (unsigned int) oldebp < (unsigned int) start)
               {
                  STACKFRAME _ss * nextebp
                     = (STACKFRAME _ss *) anded(((STACKFRAME _ss *) ebp) ->ebp);
                  void * reteip = ((STACKFRAME _ss *) oldebp) ->eip;

// check if the link is broken to avoid GPs
```

59

```
              if ((unsigned int) nextebp <  (unsigned int) ebp ||
                 (unsigned int) nextebp >= (unsigned int) stack_top)
                nextebp = (STACKFRAME _ss *) 0xFFFFFFFFL;

// in 16-bit, only the offset part needs to be compared if ((unsigned int) start < (unsigned int) nextebp)
              {
                // the access might be in the current (ebp) frame CG_FRAME _ss * c
                  = (CG_FRAME _ss *) (((unsigned int)ebp)-sizeof(CG_FRAME));

if (c->magic == CGMAGIC)
                {
                    FUNC_DESC * x = c->fd;
#ifndef __WIN32__
                    if  (isNearFrame)
                    {
                      unsigned short sel;

/*
                        One last check.  The reteip could still be a far
                        address.  We'll check to see if it's a valid pointer
                        and skip this next brutality if it is.
                      */
                      if  (!isValidCodePtr(reteip))
                        FP_SEG(reteip)=lastCS;
                    }

FP_SEG(x)=FP_SEG(reteip);
#endif
                    if (x->magic == CGMAGIC || x->magic == CGMAGIC2 &&
                       x->funcStart < reteip &&  x->funcEnd > reteip)
                    {
                       // we have a valid CG frame
                       // we are already too high up on the stack if( (unsigned int) end
                           <= (unsigned int) ebp + x->locSize)
                           return (unsigned int)ebp + x->locSize
                             - (unsigned int)start;
                       // only check through current frame // is it in this frame?

if( (unsigned int) start < (unsigned int) ebp + x->parSize)
                       {
                          // we have a descriptor for this stackframe,
                          // and we know that
                          // the reference (at least partially) is in that frame.
                          // So, we will either find the stack region,
                          // or it is illegal.

REG_DESC *startRd;
                          REG_DESC *rd, *rd1;
```

60

```
                unsigned int numOfRegions;
                int i;

if (x->magic==CGMAGIC2)
                {
                  SCOPE_DESC *s =NULL;
                  SCOPE_DESC ** sd;

// find the innermost scope for (sd = x->u.multipleScope.sd;*sd; sd++)
                  {
                    if ( (*sd)->scopeStart <= reteip
                        && (*sd)->scopeEnd   >  reteip )
                    {
                    // is it the strictest so far?

if (!s || (*sd)->scopeStart > s->scopeStart
                        || (*sd)->scopeEnd < s->scopeEnd)
                      s = *sd;
                    }
                  }
                  if (s)
                  {
                    startRd = s->rd;
                    numOfRegions = s->numOfRegions;
                  }
                  else
                  {
                    startRd = NULL;
                    numOfRegions = 0;
                  }

}
                else
                {
                  // single scope compiler
                  startRd = x->u.singleScope.rd;
                  numOfRegions = x->u.singleScope.numOfRegions;
                } for (i=0,rd=startRd;i<numOfRegions;i++, rd++)
                {
                  if ((unsigned int) start < (unsigned int) ebp
                   + rd->ebpOffset + rd->size)
                  {
                    if ( (unsigned int) start
                      >= ((unsigned int) ebp)+rd->ebpOffset)
                    {

// the pointer is in the current block

// is it OK ?

if ((unsigned int) end
                         <= ((unsigned int) ebp)+rd->ebpOffset+rd->size)
                         return ((unsigned int) ebp)
```

61

```
                    + rd->ebpOffset+rd->size-(unsigned int) ptr;

}
          // the ptr is illegal, as regions are assumed
          // in increasing order.

// break; hack - hack - hack
      }
  }

// not OK, have to generate error

//
  // find range including ptr that is in [start, end)
  //
  // if there are two ranges that include ptr,
  // pick the right one rd1=NULL;

for (i=0,rd=startRd;i<numOfRegions;i++, rd++)
    if (((unsigned int) ebp)+rd->ebpOffset
          <=(unsigned int) ptr &&
        ((unsigned int) ebp)+rd->ebpOffset+rd->size
          >=(unsigned int) ptr)
        rd1 = rd;

rd = rd1;   // ptr is in rd;

accessEvent.info = INFO_NONE;

if (rd)
  {
    if ((unsigned int) end
        > ((unsigned int) ebp)+rd->ebpOffset+rd->size)
    {
      accessEvent.code = ERR_PTR_OVERRUN | ERR_PTR_LOCAL;
      accessEvent.type.access.regionAddress
        = (void _ss *) (((unsigned int) ebp)+rd->ebpOffset);
      accessEvent.type.access.regionSize    = rd->size;
      accessEvent.type.access.scopeFrame= (void _ss *) ebp;
      accessEvent.type.access.scopeEIP
        = ((STACKFRAME *) oldebp) ->eip;
    }
    else
    {
      accessEvent.code = ERR_PTR_UNDERRUN | ERR_PTR_LOCAL;
      accessEvent.type.access.regionAddress
        = (void _ss *) (((unsigned int) ebp)+rd->ebpOffset);
      accessEvent.type.access.regionSize    = rd->size;
      accessEvent.type.access.scopeFrame= (void _ss *) ebp;
      accessEvent.type.access.scopeEIP
        = ((STACKFRAME *) oldebp) ->eip;
    }
  }
  else
```

62

```
                    accessEvent.code = ERR_PTR_STACK_INVALID;

accessEvent.f     = f;
                    accessEvent.type.access.ptr    = ptr;
                    accessEvent.type.access.offset= offset;
                    accessEvent.type.access.size   = size;

accessEvent.code |= getPtrFlags(flags);
                    logEvent(&accessEvent, wrapperEBP);
                    return 0;
                  }
                }
              }
            }
#ifndef __WIN32__
        lastCS=FP_SEG(reteip);

if (((STACKFRAME _ss *) ebp)->ebp & 1)
           isNearFrame = 0;
        else
           isNearFrame = 1;
#endif
        oldebp = ebp;
        ebp    = nextebp;
        }
      //}
      //__except(1)
      //{
      //   return -1;
      //} return stack_top-start;
      }
    }
    else
    {

// ----------------------------------------
    // C./ check the heap database
    // ----------------------------------------

REGION * r;
      EnterCriticalSection(&acc_db_lock);

r = regionTree.top;

while (r)
      {
        if (end < r->start)
          r = r->left;
        else if (start > r->end)
          r = r->right;
        else
        {
          // block overlaps into r if (start >=r->start+r->leftPad && end <=r->end-r->rightPad)
```

63

```
            {
              // it is inside r if (r->type == FREED)
                break;
              LeaveCriticalSection(&acc_db_lock);
              return r->end-r->rightPad-start;
            } if (end  == r->start) r = r->left;
            else if (start== r->end  ) r = r->right;
            else break;
          }
        }
        if (r==NULL)
        {
          // not in the regionTree. check region tree if that's OK or not
          // note, this is invalid only if the block truly
          // overlaps into the inside r = mapTree.top;
          while (r)
          {
            if (end <= r->start)
              r = r->left;
            else if (start >= r->end)
              r = r->right;
            else
            {
              // block overlaps into invalid region r
              break;
            }
          } if (r==NULL)
          {
            LeaveCriticalSection(&acc_db_lock);
            return 0;
          }
        }

//
        // problem. We can now spend some more time to figure out what's wrong
        //
        //

//
        // find range including ptr that is in [start, end)
        // it there are more, take the right side one
        // accessEvent.f    = f;
        accessEvent.code = ERR_PTR_INVALID;  // default
        accessEvent.info = INFO_NONE;       // default
        accessEvent.type.access.ptr   = ptr;
        accessEvent.type.access.offset= offset;
        accessEvent.type.access.size  = size;
```

```
                    // find if ptr falls into a block r = regionTree.top;
                    while (r)
                    {
                      if (r->start+r->leftPad> lptr)
                        r = r->left;
                      else if (r->end-r->rightPad< lptr)
                        r = r->right;
                      else
                      {

// pointer is in block r.
                        // See the resource subsystem if it has additional
                        // information for the block if (r->type==FREED)
                        {
                          addFreedMemRsrcInfo(&accessEvent,start);
                        }
                        else
                        {
                          accessEvent.type.access.regionAddress
                            = LONGTOADDR(r->start+r->leftPad);
                          accessEvent.type.access.regionSize
                            = r->end-r->start-r->leftPad-r->rightPad;

if (end>r->end-r->rightPad)
                          {
                            accessEvent.code = ERR_PTR_OVERRUN;
                              addMemRsrcInfo(&accessEvent,start);
                          }
                          else
                          {
                            assert(start<r->start+r->leftPad);
                            accessEvent.code = ERR_PTR_UNDERRUN;
                              addMemRsrcInfo(&accessEvent,start);
                          }
                        }

// continue to the right - we might find it again as a right
                        // side of a touching block pair r = r->right;
                      }
                    } accessEvent.code |= getPtrFlags(flags);

logEvent(&accessEvent, wrapperEBP);
                    LeaveCriticalSection(&acc_db_lock);
                    return 0;
                  }
                }
```

```
/*
 * validateString
 * _cg_validateString
 * Check if given string is fully contained in a user or unknown region
 *
 * returns strlen+1 if successful (including 0)
 *
 * Copyright © 1995, Borland International, Inc.
 */
unsigned long __pascal __export _cg_validateString(const char * string,
char term, FUNCTION _FAR * f, unsigned int wrapperEBP)
{
  unsigned long len;

len = validate(string, 1, f, wrapperEBP);

if (len) // string is valid for length len
  {
    const char * e;
      __try
      {
        e = memchr(string, term, len);
      }
      __except(1)
      {
        e = string;
      } if (e==0)  // generate error for accessing beyond len
      {
        validate(string, len + 1, f, wrapperEBP);
        return 0;
      }
      else
      {
        return e - string +1; //strlen+1
      }
  }
  else
  {
    return 0;
  }
}
```

What is claimed is:

1. In a development system for compiling source listings into a compiled program for execution on a computer, said source listings declaring variables for storing values during execution of the program, a method for detecting memory-access errors occurring during runtime use of the variables, the method comprising:

for each variable declared in the source listing whose storage is allocated at compile time, allocating at compile time an amount of storage space in the compiled program based on a data type for the variable;

as space is allocated in the compiled program for each variable at compile time, allocating at compile time an additional amount of storage for padding each of said variables;

maintaining information about validly allocated storage space, said information indicating storage space allocated for each of said variables;

during runtime execution of the compiled program, determining whether an attempt is mae by the compiled program, during operations involving the variables, to access memory which has not been allocated for the variables; and if such an attempt is made, indicating a memory-access error.

2. The method of claim 1, wherein said variables comprise local and global variables.

3. The method of claim 1, wherein said variables comprise function arguments, with functions being invoked with a calling convention which permits padding of function arguments.

4. The method of claim 1, wherein padding for each variable comprises a machine addressable unit.

5. The method of claim 4, wherein said machine addressable unit comprises a byte.

6. The method of claim 5, wherein said compiled program comprises compiled machine code.

7. The method of claim 1, wherein padding is allocated so that no two variables reside at contiguous locations in memory.

8. The method of claim 1, wherein said variables comprise variables of simple data types.

9. The method of claim 8, wherein said simple data types include an integer data type.

10. The method of claim 1, wherein said variables include array variables.

11. The method of claim 1, wherein said determining step includes determining for each operation involving said variables, a location and size of memory accessed for each such operation.

12. The method of claim 1, wherein said allocating an additional amount step is performed by a compiler which compiles said source listings into the compiled program.

13. The method of claim 1, wherein said information about valid storage space comprises a descriptor for each variable, for characterizing storage associated with the variable.

14. The method of claim 1, further comprising:

maintaining information about valid storage space allocated during runtime execution of the program.

15. The method of claim 14, wherein said maintaining information about valid storage space allocated dynamically is provided without direct compiler support by a runtime library.

* * * * *